United States Patent
Grivna et al.

(10) Patent No.: US 8,464,145 B2
(45) Date of Patent: Jun. 11, 2013

(54) SERIAL INTERFACE DEVICES, SYSTEMS AND METHODS

(75) Inventors: Edward L. Grivna, Brooklyn Park, MN (US); Gabriel Li, San Francisco, CA (US); Thinh Tran, Palo Alto, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 367 days.

(21) Appl. No.: 12/838,035

(22) Filed: Jul. 16, 2010

(65) Prior Publication Data

US 2011/0016374 A1 Jan. 20, 2011

Related U.S. Application Data

(60) Provisional application No. 61/226,258, filed on Jul. 16, 2009, provisional application No. 61/228,070, filed on Jul. 23, 2009.

(51) Int. Cl.
*G06F 11/00* (2006.01)
*H03M 13/00* (2006.01)

(52) U.S. Cl.
USPC .......................................... 714/801; 714/805

(58) Field of Classification Search
None
See application file for complete search history.

(56) References Cited

U.S. PATENT DOCUMENTS

| | | | |
|---|---|---|---|
| 5,629,950 A * | 5/1997 | Godiwala et al. | 714/805 |
| 5,809,543 A * | 9/1998 | Byers et al. | 711/162 |
| 6,948,031 B2 * | 9/2005 | Chilton | 711/113 |
| 7,009,872 B2 * | 3/2006 | Alva | 365/158 |
| 7,522,468 B2 * | 4/2009 | Norman | 365/230.05 |
| 7,634,707 B2 * | 12/2009 | Leung et al. | 714/763 |
| 7,761,771 B2 * | 7/2010 | Gower et al. | 714/763 |
| 7,836,378 B2 * | 11/2010 | Shaeffer et al. | 714/763 |
| 7,890,682 B2 * | 2/2011 | Kamimura et al. | 710/100 |
| 8,122,320 B2 * | 2/2012 | Fekih-Romdhane et al. | 714/763 |
| 2004/0205433 A1 * | 10/2004 | Gower et al. | 714/733 |
| 2006/0190780 A1 * | 8/2006 | Gower et al. | 714/718 |
| 2006/0236201 A1 * | 10/2006 | Gower et al. | 714/758 |
| 2006/0242541 A1 * | 10/2006 | Gower et al. | 714/767 |
| 2009/0187809 A1 * | 7/2009 | Fekih-Romdhane et al. | 714/763 |
| 2010/0269012 A1 * | 10/2010 | Hazelzet | 714/753 |

OTHER PUBLICATIONS

International Search Report of the International Searching Authority, dated Dec. 1, 2010 for International Application No. PCT/US10/42349; 3 pages.

International Written Opinion of the International Searching Authority, dated Dec. 1, 2010 for International Application No. PCT/US10/42349; 6 pages.

* cited by examiner

*Primary Examiner* — Guerrier Merant

(57) ABSTRACT

A serial interface device includes multiple serial link connections that receive at least address values and at least one error detection code (EDC) on different serial link connections, the EDC generated from at least the address values, the serial link connections for the address values and EDC operated separately from one another; and multiple output serial links, at least a first one of the output serial links outputting data values read from memory locations corresponding to the address values, and at least a second one of the output serial links different from and operated separately from the first one outputting EDC values generated for the data values read from the memory locations.

20 Claims, 26 Drawing Sheets

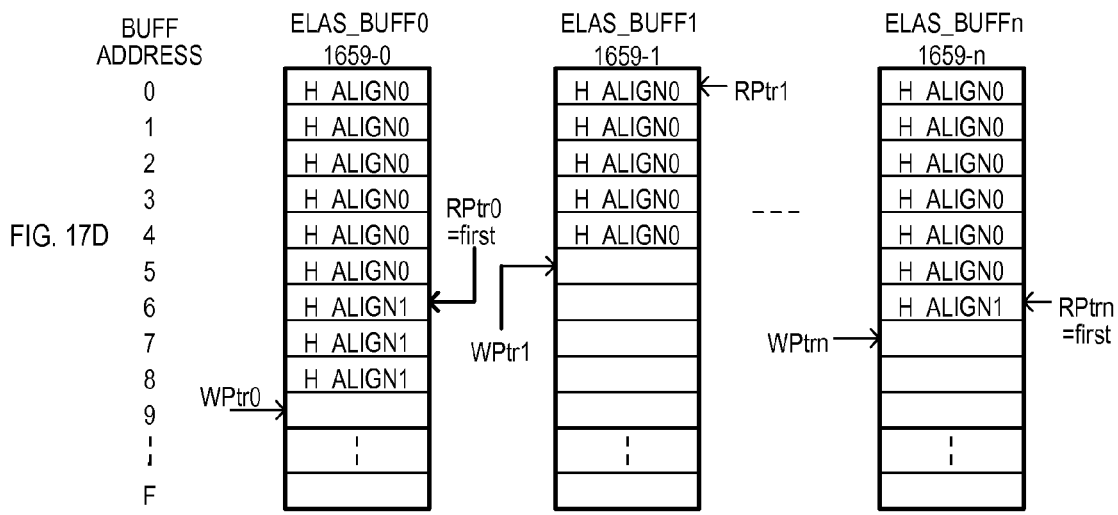
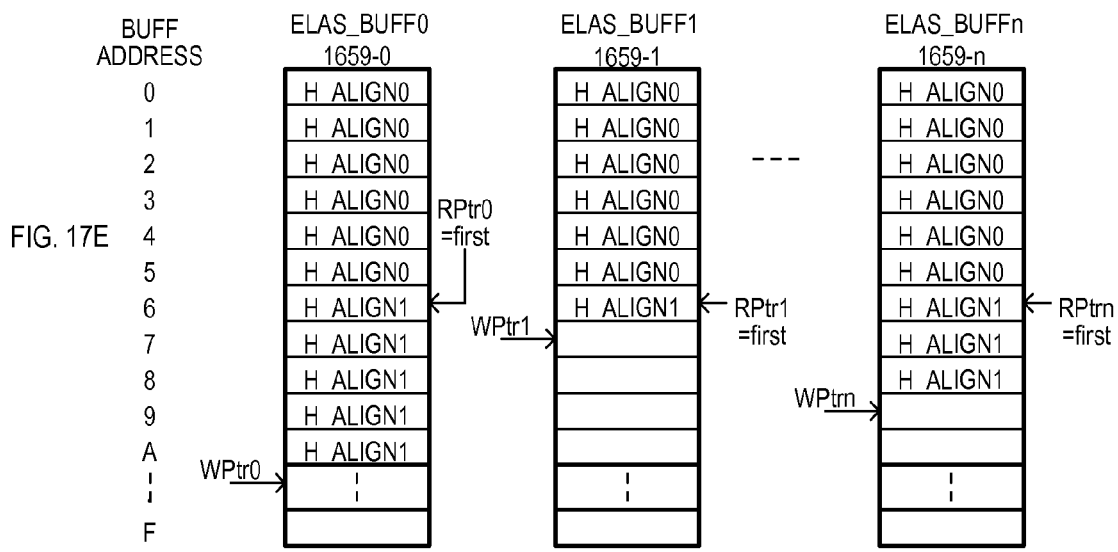
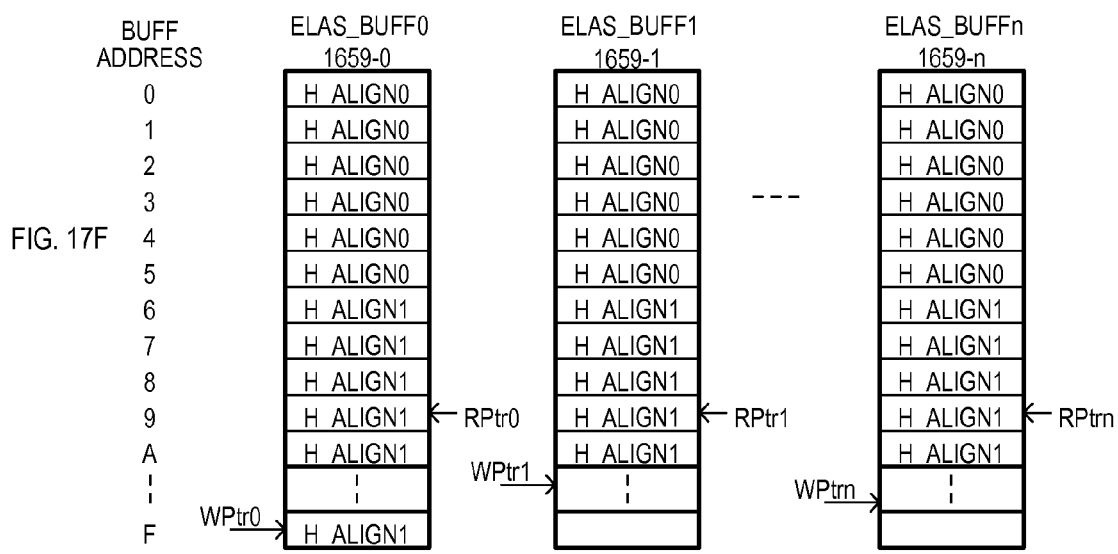

SERIAL INTERFACE DEVICES, SYSTEMS AND METHODS

This application claims the benefit of U.S. Provisional Patent Application Ser. No. 61/226,258 filed on Jul. 16, 2009, and U.S. Provisional Patent Application Ser. No. 61/228,070 filed on Jul. 23, 2009. The contents of both of these applications are incorporated by reference herein.

TECHNICAL FIELD

The present disclosure relates generally to memory devices that receive or provide data values on serial data links, and more particularly to serial memory devices, systems, and methods that transmit data values on multiple serial data links with error detection codes.

BRIEF DESCRIPTION OF THE DRAWINGS

FIGS. 17A to 17F are diagrams showing "word" synchronization operations according to an embodiment.

DETAILED DESCRIPTION

Various embodiments will now be described in detail with reference to a number of drawings. The embodiments show a serial interface device, a serial interface device system, and methods in which data may be transferred between devices on multiple serial communication links, in which all or a portion of data units and error detection codes for such data units may be transported on different serial links in proximately a same time period.

Figure 1A:
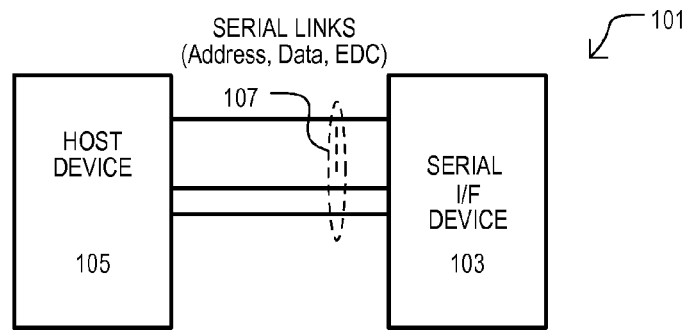
FIG. 1A is a block schematic diagram according to one embodiment.

Referring to FIG. 1A, a system according to one particular embodiment is shown in a block schematic diagram, and designated by the general reference character 101. A system may include a serial interface device 103 connected to a host device 105 by multiple serial communication links 107. Each serial communication link 107 may include a transmit end, where data units may be encoded, scrambled, serialized, or otherwise prepared for serial transmission, and driven onto a transmission media (e.g., optical, coaxial, microstrip, stripline, waveguide, twisted pair), and a receive end, where the serialized information may be captured from the transmission media, deserialized, descrambled, decoded, or otherwise converted back to their original form, and the transmission media itself. Links may include additional or fewer components as needed to interface serial signals to the appropriate transmission media.

In FIG. 1A, a serial interface device 103 may store data values for error checked read and/or write operations from a host device. Stored values may include additional error detection and correction bits to protect the data values, stored within the memory core, from corruption by voltage transients, alpha particles, cosmic rays, or other corrupting influences or events. A serial interface device 103 may include physical connections to links 107 that enable reception and/or transmission of data units to and/or from serial interface device 103.

Links 107 may enable transmission of data units between serial interface device 103 and host device 105. Such data units may contain all or portions of an address (identifying a storage location within serial interface device 103), write data (e.g., data from host device 105 for storage in serial interface device 103), read data (e.g., data from storage locations within serial interface device 103 send to host device 105) and/or commands (values indicating type of operation).

At the same time all or a portion of data units are transmitted on one or more particular serial links, all or a portion of an error detection code (EDC) for such data units may also be transmitted on one or more different serial links. In an alternate embodiment all or a portion of an EDC may be transmitted on the same links used to carry the address, read data, and/or write data.

In particular embodiments, data units transmitted over serial communication links 107 may include data values as well as control code values separate from data values.

Figure 1B:
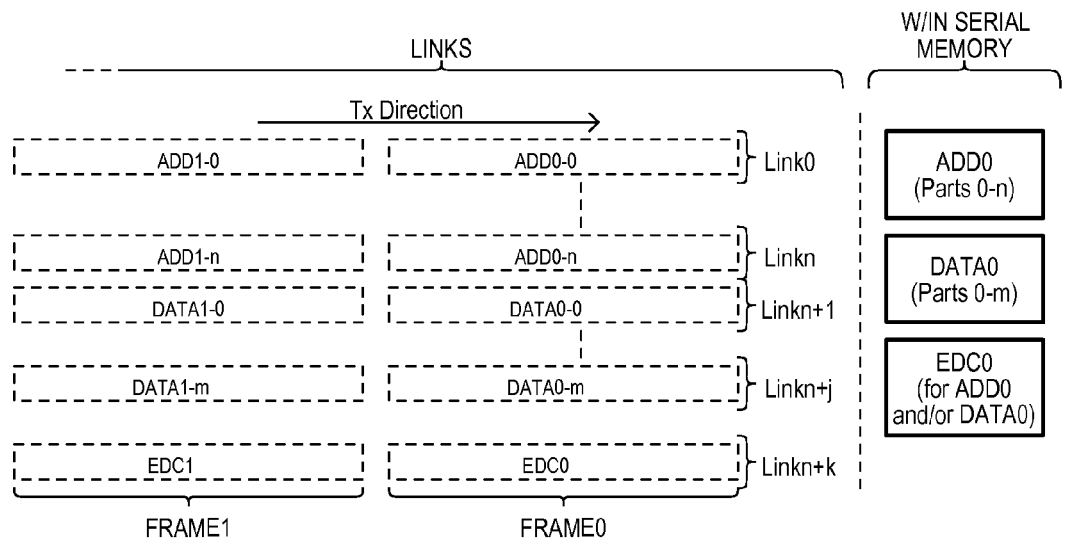
FIGS. 1B to 1E are diagrams showing serial reception and transmission of data to/from a memory device according to embodiments.

FIG. 1B shows an organization of data units received by a serial memory device according to one embodiment. Data units transported on links may be arranged into "frames" (FRAME0, FRAME1), words, or other grouped units. As will be described in embodiments below, portions of frames transported on different links are not necessarily entirely time synchronous in their departure from the host device (e.g., host 105) or arrival at the serial memory device (e.g., device 103), and can be organized or aligned with respect to one another within a serial memory device (e.g., 103). A "LINKS" portion of FIG. 1B shows examples of data units transmitted as frames on multiple serial links. A "W/IN SERIAL MEMORY" portion of FIG. 1B shows how such data values may be organized or aligned within a memory device (assuming no error has been determined between received values and a corresponding EDC).

In the embodiment depicted in FIG. 1B, one memory address (ADD0) may be received in n+1 parts, on n+1 links (where n is a non-negative integer, including 0). In a write operation, write data (DATA0) may be received on j links. In a read operation, no data may be received by the memory device 103. An error detection code (EDC0) may be received on one or more links. EDC0 may be generated by the host device 105 corresponding to at least the value of the memory address (ADD0). In particular embodiments, an EDC (EDC0) may correspond to a read address in a read operation, and may correspond to a write address and write data in a write operation.

FIG. 1B shows how each data unit may correspond to a portion of an address, data, or EDC value. In particular, Link0 to Linkn may carry Parts 0 to n of an address ADD0, Linkn+1 to Linkn+j may carry Parts 0 to m of a data value, etc.

Accordingly, FIG. 1B shows an arrangement in which a link may carry a particular type of value (e.g., address, data, EDC).

Figure 1C:
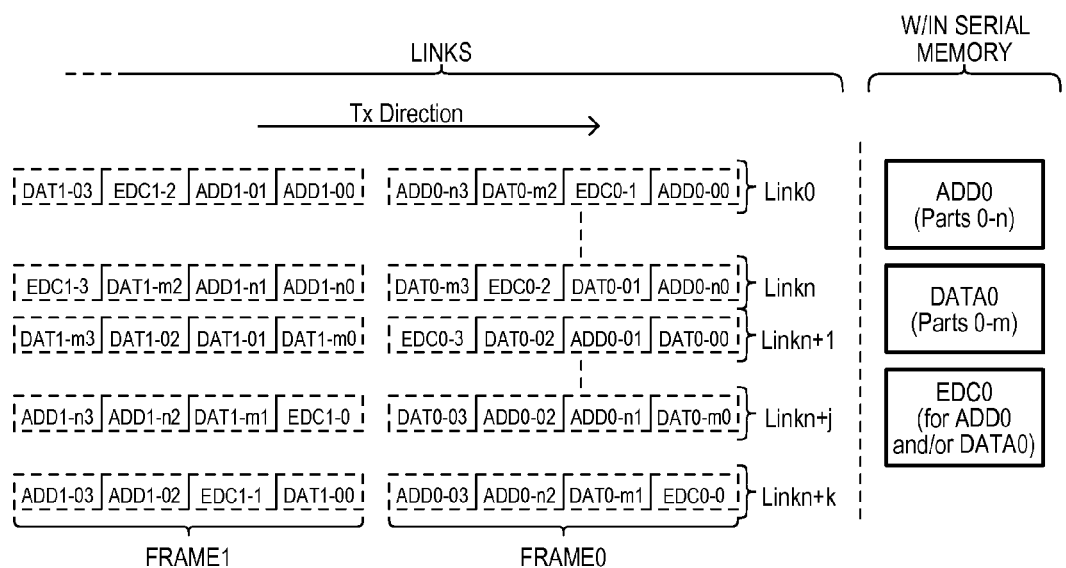

FIG. 1C shows an organization of data units received by a serial memory device according to another embodiment. Like FIG. 1B, data units transmitted on links may be arranged into "frames" (FRAME0, FRAME1).

Unlike FIG. 1B, different types of values may be interleaved and transported over multiple serial communication links. In particular, in FRAME0 for Link0, a data unit may carry a part of address ADD0 (ADD0-00), part of EDC0 (EDC0-1), part of a data value DATA0 (DATA0-$m$2), and another part of an address ADD0 (ADD0-$n$3). Such parts of different values may reassembled or reordered within a serial memory device 103 to form a complete address ADD0, write data DATA0 and/or error detection code EDC0.

Accordingly, FIG. 1C shows an arrangement in which a link may carry different types of values (e.g., address, data, EDC). Division of values may occur along bit, or multi-bit boundaries of a data unit.

Figure 1D:
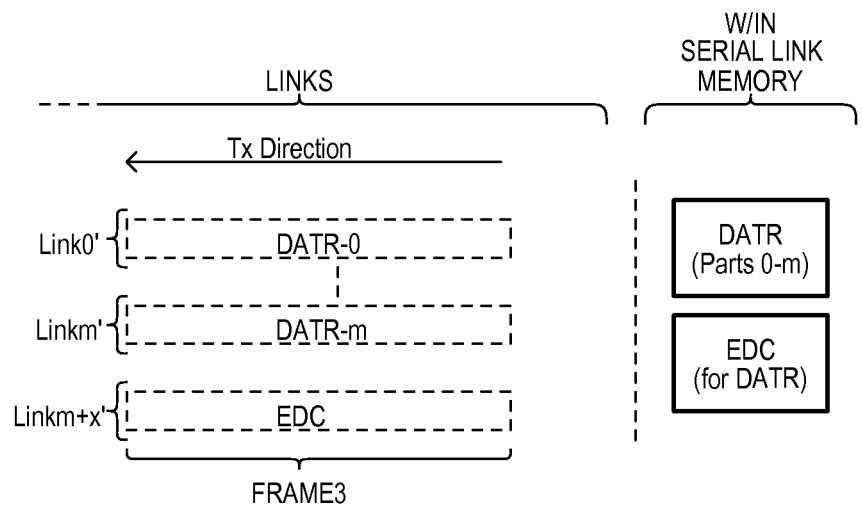

FIG. 1D shows an organization of data units transmitted from a serial memory device 103 to a host device 105 according to one embodiment. Like FIG. 1B, data units transmitted on links may be arranged into "frames" (FRAME3). A "LINKS" portion of FIG. 1D shows examples of data units transmitted on links. A "W/IN SERIAL MEMORY" portion of FIG. 1D shows how such data values may be organized or aligned within a memory device prior to being transmitted.

FIG. 1D shows values that may be transmitted from a serial memory device, for example, in response to a read address and/or command. In an alternate embodiment the memory address (associated with the read data units returned in response to a read address and/or command) may be transmitted from the serial memory device 103 back to host device 105, along with the data units. Note that returning the associated read address requires sufficient return links to carry the mix of address, data, and EDC information.

FIG. 1D shows an arrangement in which a link may carry a particular type of value (e.g., address, data, EDC), for example in response to a read address and/or command.

Figure 1E:
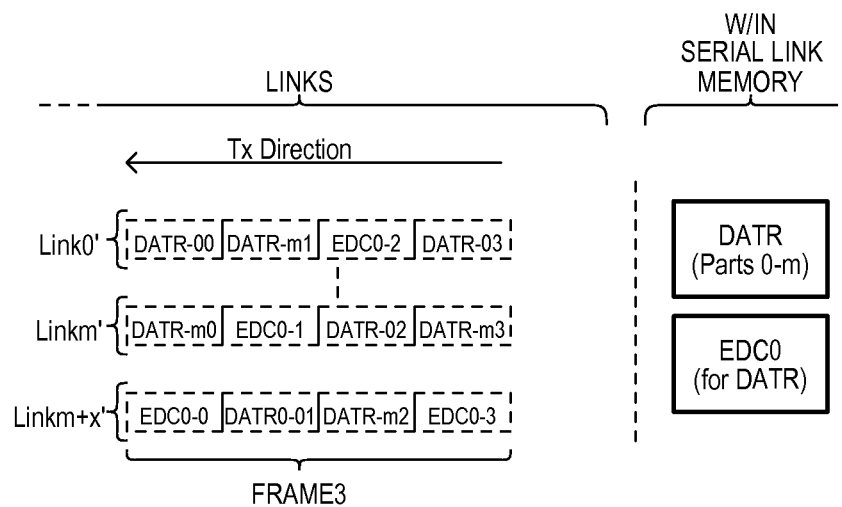

FIG. 1E shows an organization of data units transmitted from a serial memory device 103 to a host device 105 according to another embodiment. Like FIG. 1B, data units transmitted on links may be arranged into "frames" (FRAME3).

FIG. 1E shows an arrangement corresponding to that FIG. 1C. That is, a link may carry different types of values (e.g., address, data, EDC).

Figure 1F:
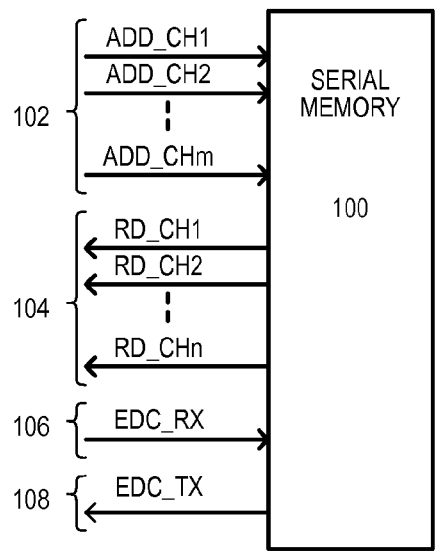
FIG. 1F is a block schematic diagram of another embodiment.

Referring to FIG. 1F, a serial memory device according to an embodiment is shown in block schematic diagram and designated by the reference character 100. A serial memory device 100 may include storage locations where data may be accessed by another device over multiple serial links. The embodiment of FIG. 1F shows multiple serial links into and out of a memory device that enable the device to respond to data read operations from a requesting device (e.g., host). In particular, serial memory device 100 may include "m" receive address serial links 102, "n" transmit data serial links 104, a receive error detection code (EDC) serial link 106, and a transmit EDC serial link 108.

Of course, alternate embodiments may have serial links in which one type value (e.g., address, write data, read data, EDC) may be interleaved with one or more other types of values.

In FIG. 1F, serial memory device 100 may receive a memory address by way of multiple data units on receive address serial links 102 (ADD_CH1 through ADD_CHm). Such an address may indicate a particular storage location within serial memory device 100. While a value "m" may be one in some embodiments, in other embodiments "m" may be greater than one. In a very particular embodiment, receive address serial links 102 may be uni-directional, allowing a memory address to be received by serial memory device 100, but not allowing a memory address to be output from serial memory device 100 on the same serial links 102.

A serial memory device 100 may also receive an EDC by way of one or more data units on a receive EDC serial link 106 (EDC_RX), where such EDC values may correspond to memory addresses transmitted on serial address links 102. Accordingly, a serial memory device 100 may utilize a receive EDC (received on an EDC_RX link) to determine if any errors have occurred in the transmission or reception of an address received on receive address serial links 102. In one embodiment, a receive EDC serial link 106 may be uni-directional, allowing receive EDCs to be received by serial memory device 100 (e.g., from a host), but not be transmitted from serial memory device 100 on such a receive EDC serial link 106.

A serial memory device 100 may further provide data corresponding to particular received memory addresses as read data on read data serial links 104 (RD_CH1 through RD_CHn). Such read data may be output as one or more data units on multiple read data serial links 104. While the number of read data serial links "n" may be one in some embodiments, in other embodiments "n" may be greater than one. In a very particular embodiment, read data serial links 104 may be uni-directional, allowing read data to be output by serial memory device 100, but not allow data to be input to serial memory device 100 on such particular read data serial links 104.

A serial memory device 100 may also transmit EDCs on a transmit EDC serial link (EDC_TX) 108, where such EDCs correspond to read data values transmitted on read data serial links 104 from serial memory device 100. Accordingly, a serial memory device 100 may generate transmit EDCs (output on EDC_TX serial links) with transmitted data having values to enable a receiving device (e.g., a host) to determine if errors have occurred in the transmission (by the serial memory device 100) or reception (by the host) of read data values transported on read data serial links 104. In one embodiment, a transmit EDC serial link 108 may be uni-directional, allowing transmit EDCs to be transmitted from serial memory device 100, but not allow receive EDCs to be received by a serial memory device 100 on such a transmit EDC serial link 108.

The particular embodiment of FIG. 1F shows an arrangement in which data may be read from serial memory device 100. In a read operation, a read address may be received on receive address serial links 102 with a corresponding receive EDC on receive EDC serial link (EDC_RX) 106. That is, a receive EDC may be an error detection code for a read address received on multiple serial links as serial data. Serial memory device 100 may check a received read address for errors utilizing the receive EDC. If an error is determined to exist between a read address and the receive EDC, a serial memory device 100 may transmit predetermined data on transmit EDC serial link 108 (EDC_TX) to notify a reading device (e.g., host device) that such an error determination has been made. If an error is not determined, a serial memory device 100 may transmit read data on read data serial links 104 along with a transmit EDC, transmitted on transmit EDC serial link (EDC_TX) 108, associated with such read data. That is, a transmit EDC may be an EDC for read data transmitted on multiple read data serial links 104 as serial data. A reading device (e.g., host device) may check received read data for errors utilizing the transmit EDC sent on transmit EDC serial link (EDC_TX) 108.

In this way, a serial memory device may receive a memory address as values received as serial data, as well as an error detection value for such a memory address received on a separate serial link(s).

Figure 2:
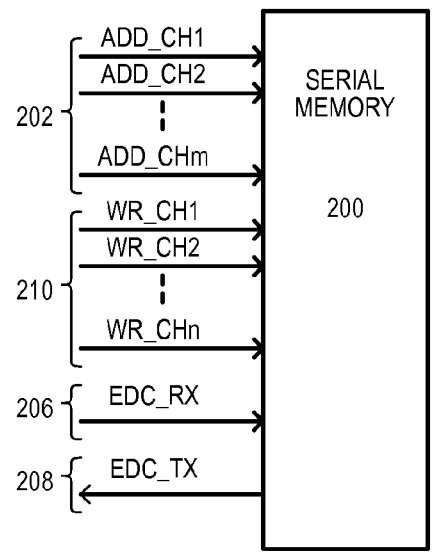
FIG. 2 is a block schematic diagram of another embodiment.

Referring to FIG. 2, a serial memory device according to another embodiment is shown in a block schematic diagram and designated by the reference character 200. A serial memory device 200 may include storage locations for storing data received from another device (e.g., host device) over multiple serial links. The embodiment of FIG. 2 shows the connections of multiple serial links to a memory device that enable the memory device to respond to data write operations from a requesting device (e.g., host). In particular, serial memory device 200 may include "m" address serial links 202, "n" data serial links 210, a receive EDC serial link 206, and a transmit EDC serial link 208.

A serial memory device 200 may receive address data by way of multiple data units on receive address serial links 202. Receive address serial links 202 may operate in the same general fashion as the receive address serial links shown as 102 in FIG. 1F, receiving addresses for a storage location, and in particular embodiments, may include uni-directional links.

Along with address data, a serial memory device 200 may also receive write data on receive data serial links 210 for storage within memory device 200. Such write data may be received as data units on multiple receive data serial links 210. As in the case of FIG. 1F, while a value "n" may be one in some embodiments, in other embodiments "n" may be greater than one. In a very particular embodiment, receive data serial links 204 may be uni-directional, allowing write data to be received by serial memory device 200, but not allow data to be transmitted from serial memory device 200 on such receive data serial links 210.

A serial memory device 200 may also receive EDCs on a receive EDC serial link (EDC_RX) 206. Such EDCs may correspond to memory addresses transmitted by another device (e.g., a host device) on receive address serial links 202 as well as data values transmitted (by the same or an associated other device) on receive data serial links 210. Accordingly, a serial memory device 200 may utilize a receive EDC to determine if errors have occurred in any of a memory address received on receive address serial links 202 or data values received on receive data serial links 210. In one embodiment, a receive EDC serial link 206 (EDC_RX) may be uni-directional.

A serial memory device 200 may also send acknowledgements on a transmit EDC serial link 208 (EDC_TX) to indicate if a write operation has been determined to be successful. In one embodiment, a serial memory device 200 may send one particular value if no errors were detected between a write address and/or associated write data and a corresponding transmit EDC, and one or more other values if an error was detected. Note that the sent value(s) may include control code values separate from data values.

The particular embodiment of FIG. 2 shows an embodiment in which data may be written to memory locations of a serial memory device 200. In a write operation, a write address may be received on receive address serial links 202 along with corresponding write data on receive data serial links 210. In addition, an EDC generated from at least both the write address and the write data may be received on receive EDC serial link 206. Serial memory device 200 may check a received write address and associated write data for errors in transport utilizing the received EDC. If an error is detected, a serial memory device 200 may transmit an error indication on transmit EDC serial link (EDC_TX) 208 to notify a writing device (e.g., host device) that an error has been determined between received address data or write data and a corresponding received EDC, and that the associated write data has not been written to the memory. If an error is not detected, a serial memory device may transmit acknowledgement data on transmit EDC serial link 208 to notify a writing device that the write address and associated write data have been received with no detected errors, and that the write data have been stored in the specified memory location.

In this way, a serial memory device may receive address values and write data values as data units, as well as an error detection code associated with such address and write data values on a separate serial link than the address data or write data.

Figure 3:
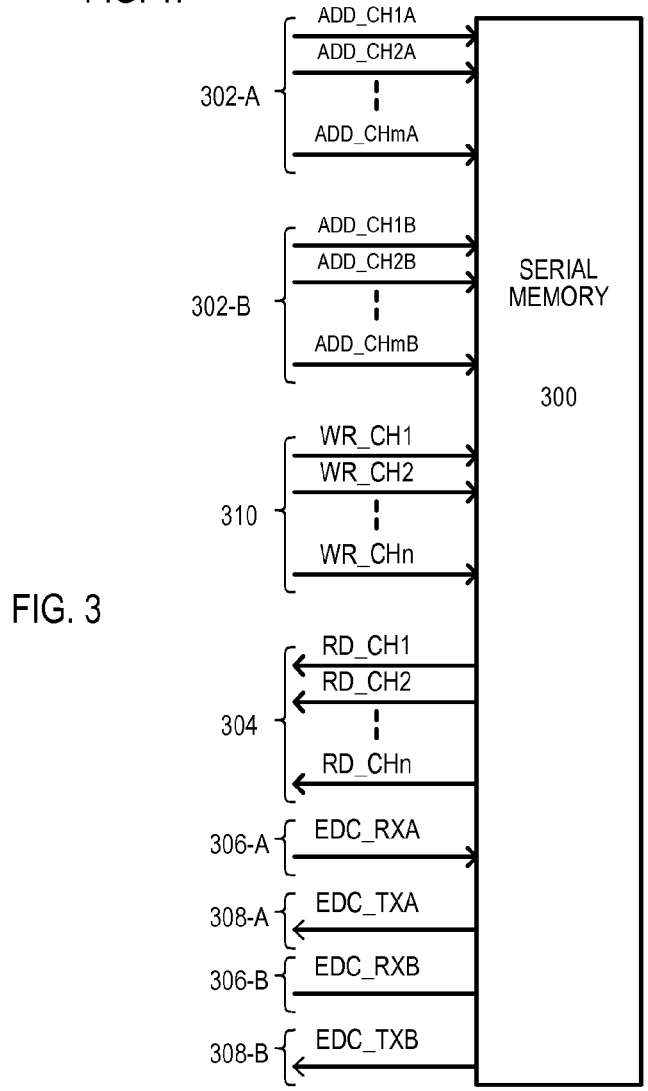
FIG. 3 is a block schematic diagram of a further embodiment.

Referring to FIG. 3, a serial memory device according to still another embodiment is shown in block schematic diagram and designated by the reference character 300. A serial memory device 300 may include locations for storing data received from another device and providing stored data to such a device over multiple serial connections. The embodiment of FIG. 3 shows multiple serial link connections to a memory device that enable the device to respond to data read operations like those described for FIG. 1F or data write operations like those described for FIG. 2. Accordingly, like items are referred to by the same reference character by with the first digit being a "3" instead of a "1" or "2".

A serial memory device 300 may include first address serial links 302-A and second address serial links 302-B. Such different address serial links may be dedicated to addresses corresponding to a particular operation. As but one example, first address serial links 302-A may receive addresses for read operations, while second address serial links 302-B may receive addresses for write operations. In an alternate embodiment, a single (i.e., shared) receive address serial links may be used to accept addresses for both read operations and write operations, wherein identification of the purpose of said address (i.e., read or write) is determined either by sequence (e.g., wherein a first address received is for a read operation and a second address received is for a write operation) or by additional bits of command information received in conjunction with said address data.

A serial memory device 300 may also include a first receive EDC serial link 306-A, first transmit EDC serial link 308-A, as well as a second receive EDC serial link 306-B and second transmit EDC serial link 308-B. Such different EDC serial links may be dedicated to particular operations. As but one example, first transmit and receive EDC serial links (306-A and 308-A) may receive EDCs and provide EDCs (or error indications) as described for FIG. 1F. In addition, second transmit and receive EDC serial links (306-B and 308-B) may receive EDCs and provide acknowledgements (or error indications) as described for FIG. 2. In an alternate embodiment, a first receive EDC serial link may receive EDCs used to detect errors for addresses and data received at all receive serial links, and a first transmit EDC serial link may be used to transmit EDCs and acknowledgements (or error indications) for all transmit serial links.

In this way, a serial memory device may perform read operation and/or write operations with respect to a host device in which error detection code data is transmitted on a separate serial link than those serial links used for transport of address data, read data, or write data.

Figure 4:
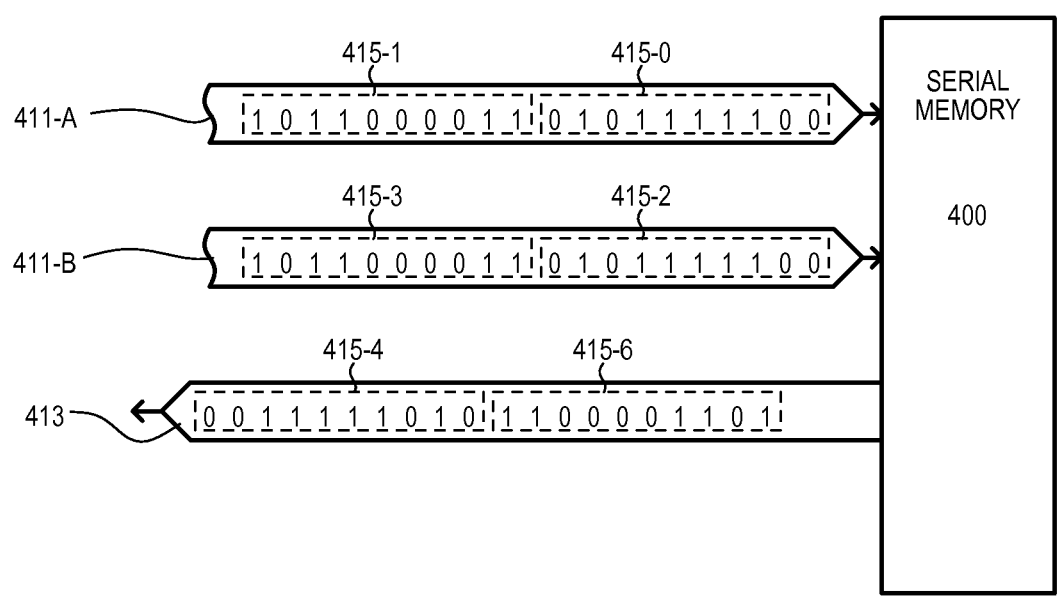
FIG. 4 is a block diagram showing serial transmission of values for an embodiment like that of FIG. 3.

FIG. 4 shows the transmission of values to and from a memory device according to one embodiment. FIG. 4 shows a memory device 400, that in particular embodiments, may correspond to memory devices in other embodiments. A memory device 400 may be connected to receive serial links, two shown as 411-A and 411-B, as well as transmit serial links, one shown as 413. A receive serial link (411-A or 411-B) may provide, as but a few examples, an address, a receive EDC, write data, or portions of such values according to embodiments shown herein, or equivalents. A transmit serial link 413 may provide, as but a few examples, read data or a transmit EDC, or portions of such values according to embodiments shown herein, or equivalents.

Referring still to FIG. 4, serial data received or transmitted on a channel (411-A, 411-B, 413) may be data units converted into transmission characters for transmission on serial media. Each transmission character may represent a logical collection of sequentially transmitted values. The very particular embodiment of FIG. 4 shows data units 415-0 to 415-6, each composed of 10 sequential bits. Such 10-bit values may be converted into 8-bit data values, or alternatively, be recognized as special "code" values. An exemplary mapping of such data values and special code values into transmission characters is described by U.S. Pat. No. 4,486,739 issued to Franaszek et al. on Dec. 4, 1984.

It is noted that the particular serial bit streams shown in FIG. 4 are arbitrary values intended to represent a transmission of serial data. It is understood that serial data values may be unencoded, encoded (e.g., represented as codes having a greater number of bits), or may be transmitted in scrambled form (i.e., received serial data may be de-scrambled by serial memory device, outgoing data may be scrambled by serial memory device). Further, a data unit (prior to encoding or scrambling) may contain portions of different values (address, data, EDC).

Figure 5A:
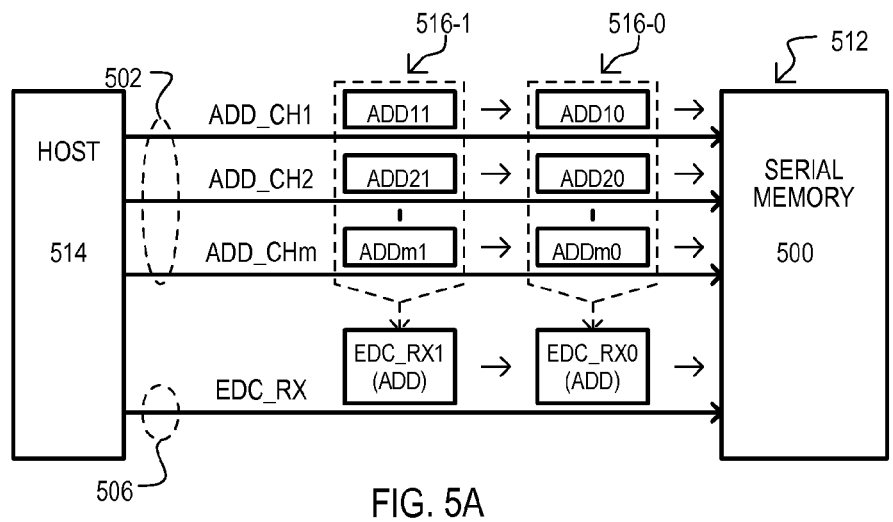
FIGS. 5A to 5C are block schematic diagrams of a system and read operation according to another embodiment.
Figure 5B:
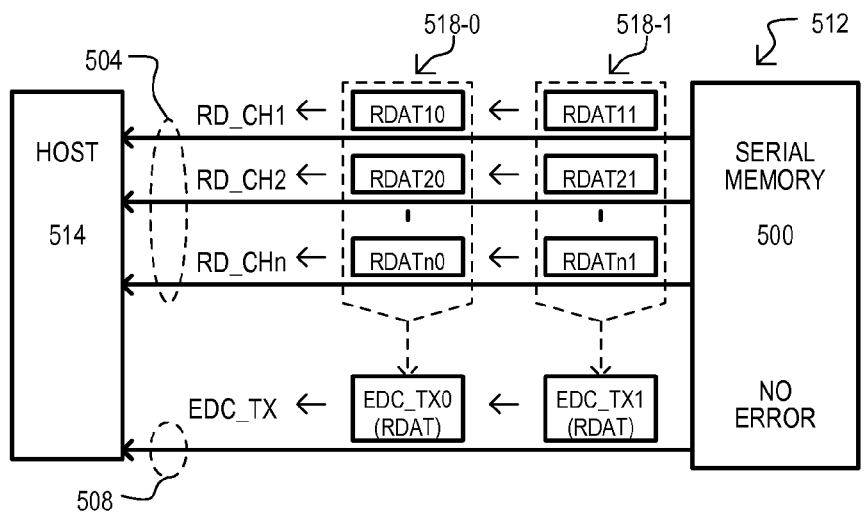
Figure 5C:
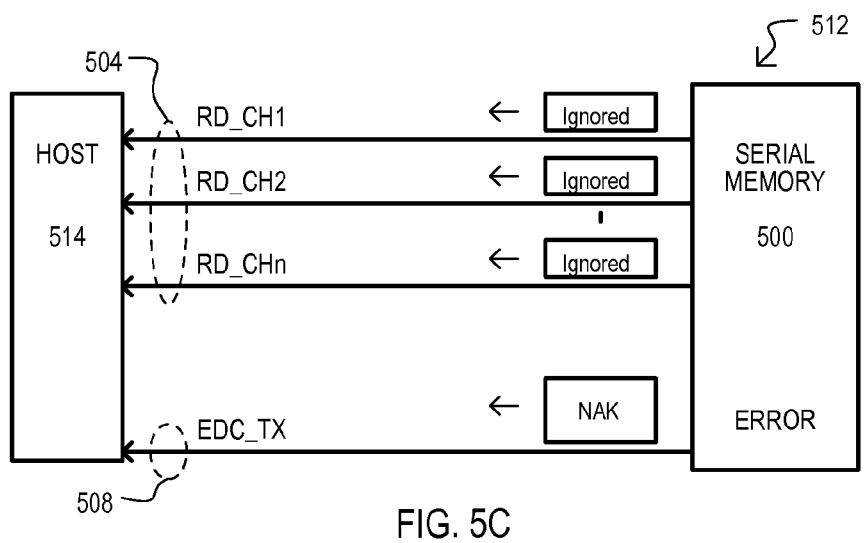

Referring to FIGS. 5A to 5C, a system and read operation according to one embodiment are shown in a series of block schematic diagrams. A system 512 may include a serial memory device 500 connected to a host device 514 by receive address serial links (ADD_CH1 to ADD_CHm, shown collectively as 502) and a receive EDC serial link 506. Read addresses may be transported in data units on one or more serial links 502.

FIG. 5A shows the transmission of two read requests from a host device 514 to serial memory device 500. In a first read request 516-0, serial address data ADD10 to ADDm0 may be transmitted on serial links ADD_CH1 to ADD_CHm, respectively. That is, a read address is included in data units ADD10 to ADDm0. Host device 514 may also transmit a read EDC (EDC_RX0). A host device 514 may generate a read EDC (EDC_RX0) from address data units (ADD10 to ADDm0). In one very particular embodiment, such an error detection code may be generated with a cyclic redundancy check (CRC) function. In a second read request 516-1, serial address data units ADD11 to ADDm1 and receive EDC (EDC_RX1) may be transmitted. Code EDC_RX1 may be generated by host device 514 from the address included within address data units (ADD11 to ADDm1).

FIG. 5B shows host device 514 receiving two read responses from serial memory device 500. In one embodiment, read responses 518-0 and 518-1 may correspond to read requests 516-0 and 516-1, respectively.

In a first read response 518-0, read data units RDAT10 to RDATn0 may be received by host device 514 on serial links RD_CH1 to RD_CHn, respectively. Host device 514 may also receive a read data EDC (EDC_TX0). A serial memory device 500 may generate a read data EDC (EDC_TX0) from read data included within read data units (RDAT10 to RDATm0). As in the case of the transmitted read EDC (EDC_RX0/1) in FIG. 5A, in one very particular embodiment, such an error code may be generated with a CRC function. In a second read response 518-1, read data units RDAT11 to RDATm1 and EDC (EDC_TX1) may be received by host device 514. Code EDC_TX1 may be generated by serial memory device 500 from read data included within read data units (RDAT11 to RDATm1).

FIG. 5C shows host device 514 receiving an error indication value (NAK) from a serial memory device 500. Such an action may take place in the event serial memory device 500 determines that an error exists between the received read address and the associated EDC (e.g., EDC_RX0/1). As shown in FIG. 5C, in the error case, any serial data on serial links 504 may be ignored (or serial memory device may not transmit any data on such links, but may instead transmit various control codes or other "fill" information to maintain serial link synchronization). In an alternate embodiment the NAK code may be sent as the fill information on the non-EDC links.

In one very particular embodiment, data may be transported between a serial memory device 500 and host device 514 as 10-bit transmission characters, some of which may be encoded 8-bit data values and others control code values. An error indication value NAK may be a 10-bit control code. Even more particularly, a value NAK may be a control code referred to as K28.4, which may have a value "0011110010" when transmitted during a negative running disparity, and the inverse "1100001101" when transmitted during a positive running disparity.

In this way, a read address may be transmitted in multiple data units on different serial links along with an EDC for such a read address. A serial memory device may return read data in data units along with an EDC value for such read data.

Figure 6A:
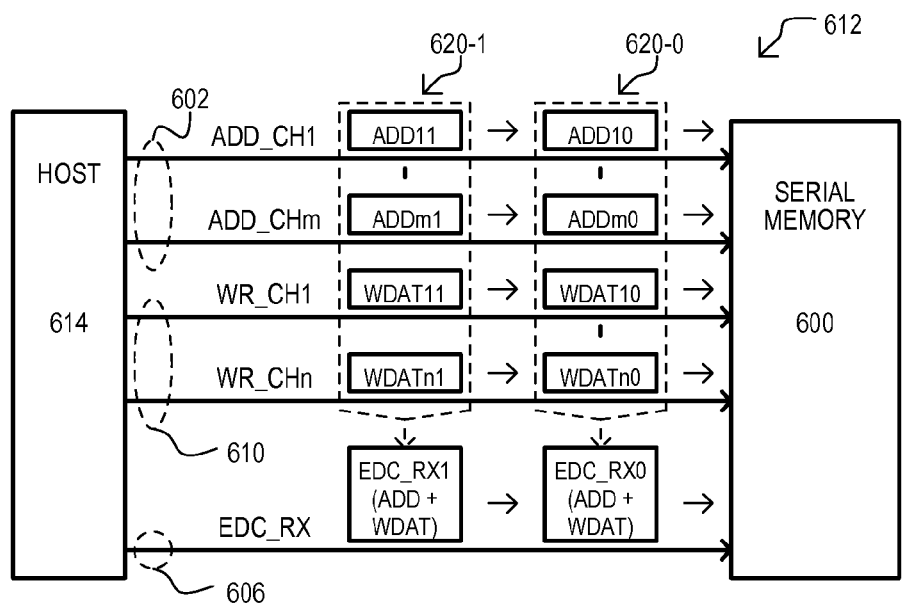
FIGS. 6A to 6C are block schematic diagrams of a system and write operation according to another embodiment.
Figure 6B:
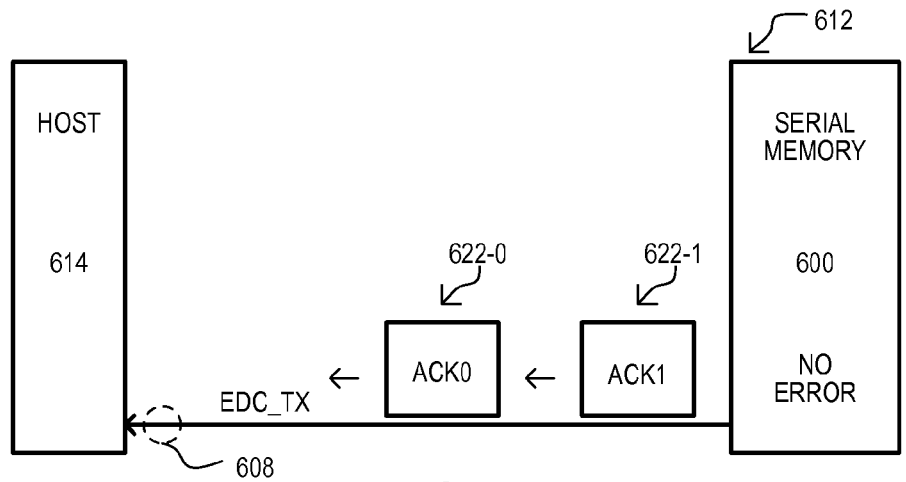
Figure 6C:
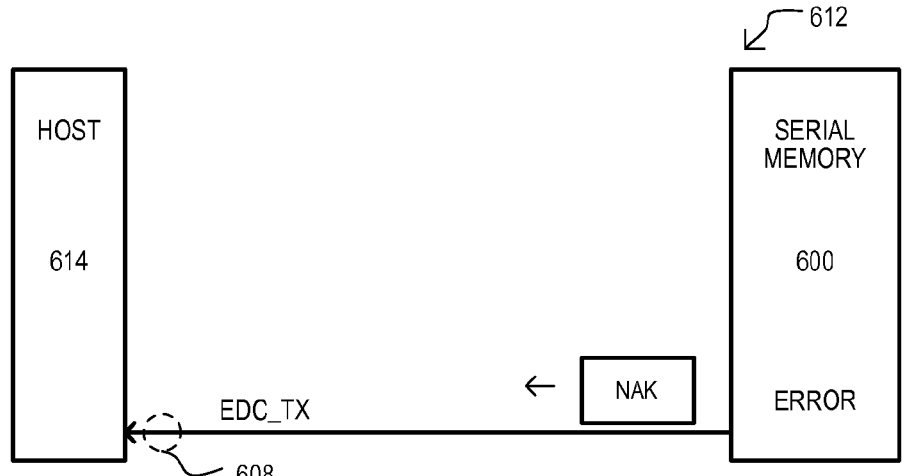

Referring to FIGS. 6A-6C, a write operation for a system like that shown in FIGS. 5A to 5C is shown in a series of block schematic diagrams. A system 612 may include items like those of FIGS. 5A to 5C, and like items are referred to by the same reference character but with the first digit being a "6" instead of a "5". Serial memory device 600 may be connected to a host device 614 by receive address serial links 602 (ADD_CH1 to ADD_CHm, shown collectively), write data serial links 610, and a receive EDC serial link 606. Write addresses may be transported in data units on one or more serial links 602. Write data may be transported in data units on one or more write serial links 610. As in the case of FIGS. 5A to 5C, in very particular embodiments, such data units may be 10-bit transmission characters that correspond encoded 8-bit data values and a set of control codes.

FIG. 6A shows the transmission of two write requests from a host device 614 to serial memory device 600. In a first write request 620-0, address data units ADD10 to ADDm0 may be transmitted on serial links ADD_CH1 to ADD_CHm, respectively, along with write data units WDAT10 to WDATn0 on serial data links WR_CH1 to WR_CHn, respectively. That is, a write address may be included in data units ADD10 to ADDm0, and write data intended for storage at such a write address may be included in data units WDAT10 to WDATn0. Host device 614 may also transmit a write EDC EDC_RX0. A host device 614 may generate a write EDC (EDC_RX0) from an address included within data units (ADD10 to ADDm0) as well as write data included within data units (WDAT10 to WDATm0). In one very particular embodiment, such an error code may be generated with a CRC function. In a second write request 620-1, data units ADD11 to ADDm1, data units WDAT11 to WDATn1 and write EDC value (data unit EDC_RX1) may be transmitted. EDC EDC_RX1 may be generated by host device 614 from an address included within data units (ADD11 to ADDm1) and write data included within data units (WDAT11 to WDATn1).

FIG. 6B shows host device 614 receiving two write responses from serial memory device 600. In FIG. 6B, write responses 622-0 and 622-1 may be generated in response to write requests 620-0 and 620-1 (of FIG. 6A). Further it is assumed that serial memory device 600 does not detect errors in such requests (620-0 and 620-1) utilizing EDC values EDC_RX0 and EDC_RX1. Because no errors are detected, a serial memory device 600 may transmit acknowledgement responses (ACK0 and ACK1) indicating that no errors have been detected.

As in the case of FIGS. 5A to 5C, in one very particular embodiment, data may be transported between a serial memory device 600 and host device 614 as 10-bit transmission characters, some of which may be encoded 8-bit data values and others being control code values. An acknowledgement value ACK may be a 10-bit control code. Even more particularly, a value ACK may be a control code commonly referred to as K28.6, which may have a value "001111 0110" when transmitted during a negative running disparity, and the inverse "110000 1001" when transmitted during a positive running disparity.

In an alternate embodiment, acknowledgement values may be the same as corresponding received EDC values (EDC_RX0 and EDC_RX1) originally transmitted by host device 614, as shown in FIG. 6A. That is, in such an embodiment, ACK0=EDC_RX0 and ACK1=EDC_RX1 (accounting for variances resulting from changes due to a running disparity value).

FIG. 6C shows host device 614 receiving an error indication value (NAK) from a serial memory device 600. Such an action may take place in the event serial memory device 600 determines that received write address, write data, or associated EDC value (e.g., EDC_RX0/RX1) includes an error. As in the case of FIGS. 5A to 5C, in one very particular embodiment, data may be transmitted as 10-bit transmission characters, and a value NAK may be a 10-bit control code. Even more particularly, a value NAK may be control code K28.4.

In this way, write addresses and write data may be transmitted in multiple data units on different serial links along with associated EDCs for such addresses and data. A serial memory device may return an acknowledgement in a serial data unit to confirm a write address, a write data, and a receive EDC have been determined to be received without error.

Figure 7:
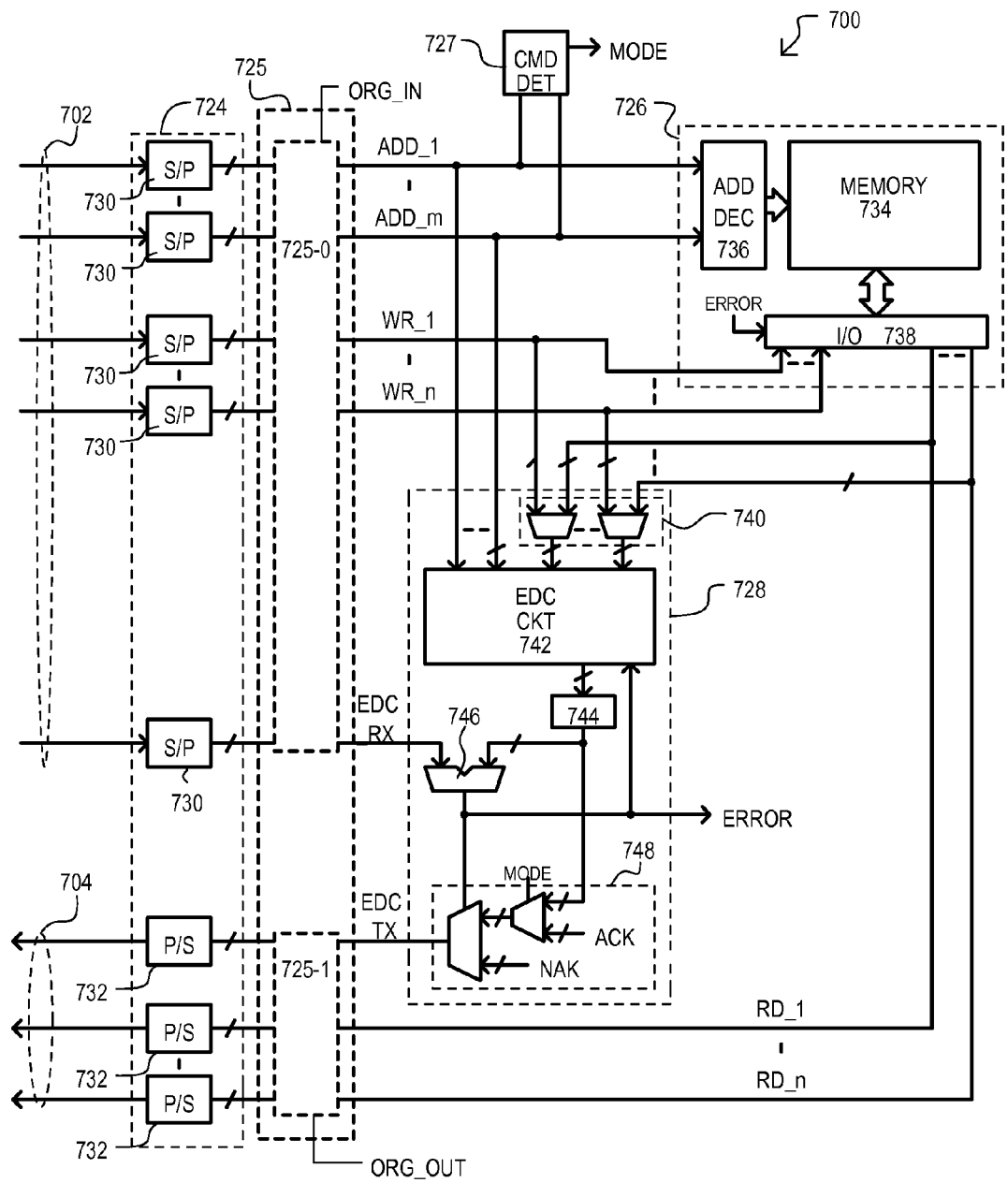
FIG. 7 is a block schematic diagram of a serial memory device according to a particular embodiment.

Referring now to FIG. 7, a serial memory device according to another embodiment is shown in a block schematic diagram, and designated by the general reference character 700. A serial memory device 700 may include an interface section 724, optionally an organizing and aligning section 725, a memory section 726, a command detect section 727, and an error check section 728.

An interface section 724 may receive serial bit streams on multiple serial links 702, and convert such serial bit streams into data units. Such conversion may include decoding and/or descrambling. An interface section 724 may also transmit serial bit streams on multiple serial links 704, wherein the transmitted serial bit streams are conversions or transforms of data units. Such conversion may include encoding and/or scrambling. In the embodiment of FIG. 7, an interface section 724 may include serial-to-parallel conversion (S/P) circuits 730 as well as parallel-to-serial conversion (P/S) circuits 732. S/P circuits 730 may convert serial bit streams received by a serial memory device 700 into parallel data for use within device 700. Conversely, P/S circuits 732 may convert parallel data from within device 700 into serial bit streams for output from serial memory device 700. In particular embodiments, S/P circuits 730 may include decoder circuits that may decode serial data units into data values or detect predetermined control codes. S/P circuits 730 may also include a framer circuit for properly detection of character boundaries in the received serial bit streams. Similarly, in particular embodiments, P/S circuits 732 may include encoder or scrambler circuits that may encode data values or control codes into serial bit streams.

An optional organizing section 725 may include an input parsing section 725-0 that may organize incoming data into predetermined data types, including memory addresses (ADD_1 to ADD_CHm), write data (WR_1 to WR_n), and received EDC codes (EDC_RX). In the embodiment shown, a value ORG_IN may dictate how incoming data are organized. An input parsing section 725-0 may be included in the event different data types are received over a same serial link, or if the device is configurable to support multiple organizations of receive address/data/EDC.

An optional organizing section 725 may also include an output parsing section 725-1 that may organize outgoing data types into data units for serialization and transmission. In the embodiment shown, different outgoing data types (read data values (RD_1 to RD_n) and transmitted EDC codes (EDC_TX)) may be transmitted as serial bit streams on different serial links and/or have portions that are interleaved within a same serial data unit. A value ORG_OUT may dictate how outgoing data are organized.

A memory section 726 may include a memory array 734, an address decoder 736, and an input/output (I/O) circuit 738. A memory array 734 may include a number of memory cells for storing data in write operations, and outputting stored data in read operations. An address decoder 736 may decode addresses, received on all or a subset of the receive serial links 702, to access particular locations within memory array 734. An I/O circuit 738 may provide a write data path into, and read data path from, memory array 734. In particular, an I/O circuit 738 may provide a write data path for write data, received on all or a subset of the receive serial links 702, into memory array 734, as well as a read data path from memory array 734. Such a read data path may provide read data to all or a subset of the serial links 704, as well as to EDC section 728.

A command detect section 727 may determine a type of operation (e.g., read, write, no operation (NOP), diagnostic) based on values received. In the very particular embodiment shown, a command detect section 727 may determine a particular operation type based on one or more bits received as part of what would be a received memory address (ADD_1 to m). For example, if the address field transported across ADD_1, ADD_2, and ADD_3 may include a 24-bit field A[23:0], bits A[22:0] may be passed to address decoder block 736 to address a specific location in memory 734, and bit A[23] may be passed to command detect block 727 to determine a read or write operation.

An error check section 728 may check for errors between received address, data, and a corresponding EDC value, and in addition, generate error detection codes for outgoing read data values. In the very particular embodiment of FIG. 7, error check section 728 may include input multiplexers (MUXs) 740, an EDC check/generate circuit 742, an EDC value register 744, a code comparator 746, and a code selector 748.

Input MUXs 740 may selectively connect write data received from all or a subset of the receive serial links 702, or read data received from memory section 726 to EDC check/generate circuit 742, depending upon mode of operation (e.g., read or write as determined by command detect section 727).

An EDC check/generate circuit 742 may generate an EDC value in response to a) a received read address, b) a received write address and received data value, c) the contents of a read memory location, and d) the contents of a read memory location and its received read address. In one embodiment, an EDC check/generate circuit 742 may perform a CRC on received values to generate a CRC type error code. In addition to receiving read or write data values from input MUXs 740, EDC check/generate circuit 742 may also receive address values received from all or a subset of the receive serial links 702. EDC check/generate circuit 742 may generate an error code from combinations or subsets of values received.

In one particular embodiment, in a read operation, EDC check/generate circuit 742 may first generate an EDC value from a read address received on all or a subset of the receive serial links 702. Subsequently, EDC check/generate circuit 742 may generate an EDC value from read data received from input MUXs 740 (as read from memory section 726). In a write operation, EDC check/generate circuit 742 may generate an EDC value from a write address received on all or a subset of the receive serial links 702 and write data (also received initially on all or a subset of the receive serial links 702) received from input MUXs 740.

While FIG. 7 shows one EDC check/generate circuit for error checking in read and write operations, alternate embodiments may include separate EDC check/generate circuits for read and write operations. Additional embodiments for EDC generation may also include the read address in the EDC generation along with the data read from memory section 726. This may provide additional protection to the protocol to ensure that the data returned to the host was from the proper location in the memory. Different embodiments of EDC check and generation circuits may also not require a direct match comparison to a received EDC value, but may instead generate a fixed value, e.g. all zeros, when the received EDC value is also included as input to the EDC check/generate circuit.

EDC value register 744 may store an EDC generated by EDC check/generate circuit 742 to provide such a value to code comparator 746 and to a code selector 748. Code comparator 746 may compare an EDC value from EDC check/generate circuit 742 to a code received on all or a subset of the receive serial links 702. A result of such a comparison may be provided to code selector 748. A code selector 748 may output various values depending upon a comparison result and configured operating mode. In particular, if configured in an error checking mode and a comparison result indicates an error in received values, code selector 748 may output an error indication (e.g., NAK). However, if a comparison result does not indicate an error in received values, code selector may output a read data EDC in a read operation, or an acknowledgement (ACK) in a write operation.

It should be noted that exemplary block schematic diagram 700 is shown only with those blocks needed to convey the operations of various embodiments described herein. Embodiments may also include additional delay, alignment, pipeline, or other registers suitable to ensure that operations occur correctly and that associated address and data remain aligned.

Having described various items that may be included in a serial memory device 700, various operations of such device will now be described.

In a read operation, a read address may be received in one or more data units on all or a subset of the receive serial links 702 and an EDC value for such a read address may be received as one or more data units on all or a subset of the receive serial links 702. Such data units may be converted from serial bit streams received by corresponding S/P circuits 730 into parallel address and EDC values. In one embodiment, data units may be received as 10-bit transmission characters that may be converted to 8-bit data values (bytes) and control codes.

In some embodiments, specific receive serial links 702 may have dedicated functions (e.g., only carry address, write data, or EDC). In such embodiments, parsing or mapping of incoming data values may not occur. However, if different data types are interleaved (spatially across the multiple parallel data values or temporally across multiple sequential parallel values), an organizing section 725 may compose address, data, and EDC values according to value ORG_IN.

Received addresses may be applied to EDC check/generate circuit 742, command detect section 727, and address decoder 736. For read operations, EDC check/generate circuit 742 may generate an EDC value from a received address and output such a value to code comparator 746 via EDC value register 744. Code comparator 746 may compare the EDC value generated from a received address to the EDC value provided with the address. Alternately the received address and EDC may be applied to the EDC check/generate circuit 742, and output such a value to code comparator 746 via EDC value register 744. Code comparator 746 may compare the EDC value generated from a received address and EDC value to a constant. A comparison result may be output as a signal ERROR.

If a signal ERROR indicates that a received address and EDC include an error, code selector 748 will select an error indication code NAK for output as a transmit EDC_TX. In some embodiments, if a signal ERROR indicates an error, the corresponding address may be prevented from being applied to address decoder 736, or read data associated with said address may be prevented from being output from I/O circuit 738, or read data units may be prevented from being output as serial bit streams on serial data links 704, as but a few examples.

A read address applied to address decoder 736 may be decoded to access a particular storage location in memory array 734. Memory array 734 may output read data via I/O circuit 738. Such read data may be optionally organized into data units (or portions of such data units) within outgoing parsing section 725-1 and then converted into serial bit streams by P/S circuits 736. In addition, read data may also be applied to EDC check/generate circuit 742 via input MUXs 740 which may generate an EDC_TX value for such read data. Provided a received read address and associated received EDC contains no errors, code selector 748 may output such a generated read data EDC as an EDC_TX value. A corresponding P/S circuit 736 may convert all or a portion of such an EDC value into a serial bit stream for output on one or more of transmit serial links 704.

In a write operation, a write address may be received in serial bit streams on all or a subset of the receive serial links 702, write data may be received in serial bit streams on all or a subset of the receive serial links 702, and an EDC for such write address and data values may be received in one or more serial bit streams on all or a subset of the receive serial links 702. Such serial bit streams may be converted by corresponding S/P circuits 730 into data units containing a write address, write data, and EDC values. In one embodiment, serial bit streams may be composed of 10-bit transmission characters that may be converted to 8-bit data values (bytes) and control codes. If such values were interleaved, an input parsing section 725-0 may organize them appropriately.

A write address may be applied to EDC check/generate circuit 742, command detect section 727, and address decoder 736. Write data may be applied to EDC check/generate circuit 742 as well as I/O circuit 738. EDC check/generate circuit 742 may generate an EDC value from a write address and write data and output such a value to code comparator 746 via EDC value register 744. Code comparator 746 may compare the EDC value generated from received write address and write data to the EDC value provided with such a write operation. Alternately EDC check/generate circuit 742 may generate an EDC value from a write address, write data, and associated receive EDC and output such a value to code comparator 746 via EDC value register 744. Code comparator 746 may compare the EDC value generated from a received write address, received write data, and EDC value to a constant. A comparison result may be output as a signal ERROR.

If a signal ERROR indicates that a received write address, write data, or associated EDC includes an error, code selector will select an error indication code NAK for output on one or more of the transmit serial links 704. In some embodiments, if a signal ERROR indicates an error, a write address may be prevented from being applied to address decoder 736, write data may be prevented from being input by I/O circuit 738 to memory array 734, or the write enable signal may be blocked from the memory array 734, as but a few examples.

It should also be noted that serial link-level errors, such as invalid timing or signal amplitude of bits in any of the received serial bit streams, loss of character framing, or receipt of an invalid transmission character may also force the ERROR signal to indicate an error condition and prevent memory write or read operations.

A memory write address applied to address decoder 736 may be decoded to access a particular storage location in memory array 734. Write data applied to I/O circuit 738 may be applied to memory array 734 and stored in the location selected by the write address.

If received write address, write data, and associated EDC are determined to contain no errors, code selector 748 may output an acknowledgement (ACK) code. A corresponding P/S circuit 736 may convert such an ACK code into a transmission character, and output it as a portion of a serial bit stream on one or more of transmit serial links 704. In an alternate embodiment, a same EDC value received on receive serial links 702 may be output on one or more of transmit serial links 704 as an acknowledgement.

Figure 8:
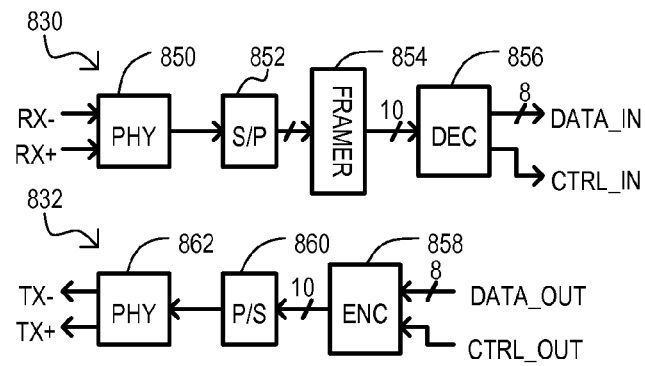
FIG. 8 is a block schematic diagram showing input and output interface circuits that may be included in embodiments.

Referring now to FIG. 8, particular examples of input and output interface circuits that may be included in the embodiments is shown in block schematic diagrams. FIG. 8 shows an S/P path 830 and P/S path 832 that may be included in embodiments. An S/P path 830 may include an input physical (PHY) interface 850, a serial-to-parallel converter 852, a framer 854, and a decoder 856. A PHY interface 850 may generate bit values from detected changes in potential on physical signal connections, which in the particular embodiment shown may be serial differential two-wire connection RX−/RX+. A serial-to-parallel converter 852 may convert serial data output from input PHY interface 850 to parallel data. A framer 854 may frame parallel bit values to indicate the start and stop of received transmission characters. In the particular embodiment shown, framer 854 frames 10-bit values. Such 10-bit transmission characters may be provided to decoder 856, which decodes such transmission characters into either 8-bit data values (DATA_IN) or into control codes (CTRL_IN) that are different from such 8-bit data values (i.e., based on the current running disparity of the receive decoder, of the $2^{10}$ possible transmission characters, $2^8$ decode into 8-bit data values, a small portion of the remaining transmission characters decode into control codes, and the remainder are detected as invalid characters which cause the ERROR signal to indicate the received data is in error).

Referring still to FIG. 8, a P/S path 832 may include an encoder 858, a parallel-to-serial converter 860, and an output PHY interface 862. An encoder 858 may receive 8-bit data values (DATA_OUT) or control values (CTRL_OUT), and encode such values into 10-bit transmission characters. Parallel-to-serial converter 860 may convert 10-bit transmission characters into a serial bit stream of data. An output PHY interface 862 may drive physical signal connections to different voltages and/or with different currents to transmit a serial bit stream. In the particular embodiment shown, output connections may be serial differential two-wire connections TX−TX+.

In this way, a serial memory device may include two-wire differential interfaces for receiving or transmitting address data, read data, write data, and error detection code data.

While embodiments above have shown serial memory devices (and systems including such memory devices) having non-dedicated serial links as well as serial links dedicated to particular information types (e.g., address, data, EDC), alternate embodiments may include configurable input connections. One embodiment having configurable connections is shown in FIG. 9.

Figure 9:
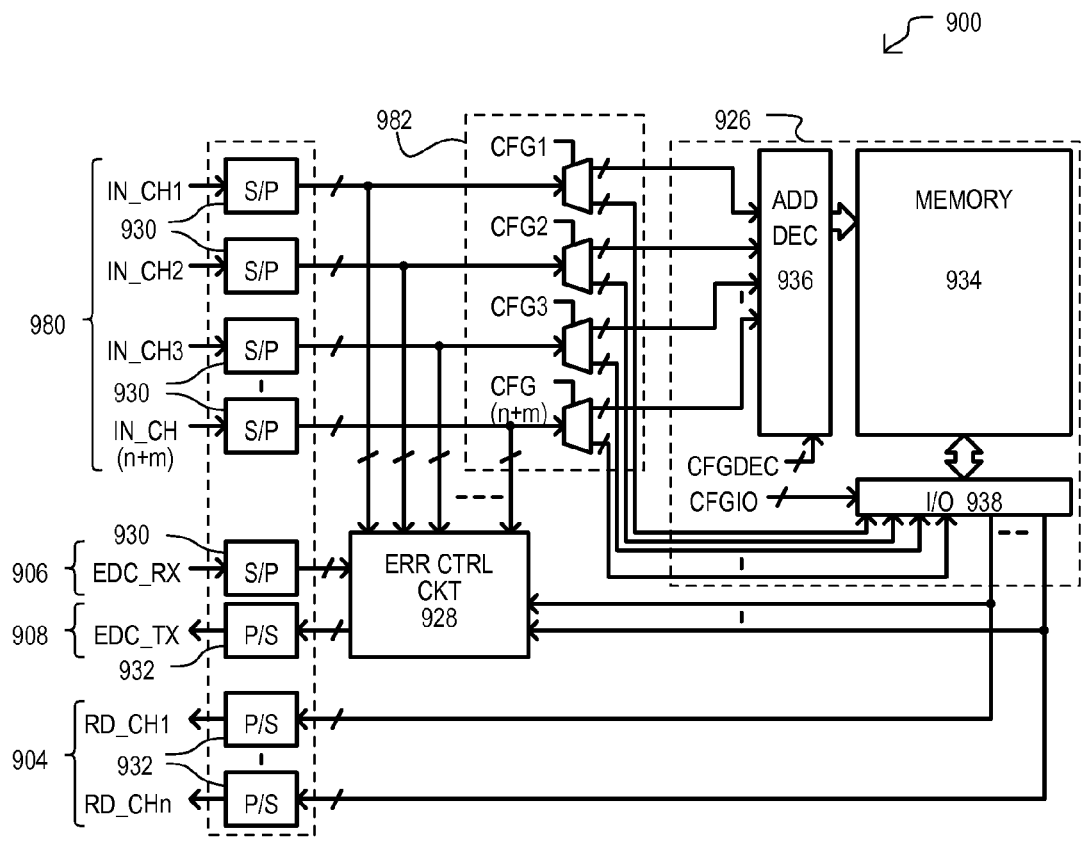
FIG. 9 is a block schematic diagram of a serial memory device according to another particular embodiment.

Referring to FIG. 9, a serial memory device according to a particular embodiment is shown in a block schematic diagram, and designated by the general reference character 900. A serial memory device 900 may include some sections like those of FIG. 7. Accordingly, like sections are referred to by the same reference character, but with the first digit being "9" instead of "7".

Unlike the embodiment of FIG. 7, serial memory device 900 may include configurable serial links 980. Configurable serial links 980 may provide receive links configurable as inputs for address or data. In the very particular embodiment of FIG. 9, assuming serial memory device 900 includes eight configurable receive serial links, in one configuration, four links may receive an address, while the remaining four links may receive write data. However, in another configuration, six links may receive an address, while the remaining two links may receive write data.

In the embodiment of FIG. 9, a serial memory 900 may further include configuration switch section 982. A configuration switch section 982 may selectively connect data received on configurable serial links 980 to address decoder 936 (i.e., as part of an address) or to I/O circuit 938 (as write data) according to configuration values CFG1 to CFG(n+m). Configuration values (CFG1 to CFG(n+m)) may be programmable values stored in a volatile and/or nonvolatile fashion within the serial memory device 900, may be values or signals received externally, or may be "hardwired" values (e.g., fabrication option).

Within memory section 926, address decoder 936 may be configurable in response to a value CFGDEC to decode an appropriate number of address bits. In a similar fashion, an I/O circuit 938 may also be programmable to provide write data at a suitable width to a memory array 934, and to output read data at a suitable width. In the particular embodiment shown, I/O circuit 938 may be configurable in response to configuration values CFGIO. In response to control signals such as CFGDEC and CFGIO, the internal memory array 934 may also be mapped to appear as different configurations of memory width and depth; e.g., a 4 megabyte memory may be changed to be addressable as A[19:0] (20-bit address) by 32-bits wide, A[20:0] (21-bit address) by 16-bits wide, or A[21:0] (22-bit address) by 8-bits wide.

In this way, a serial memory device may have configurable serial links along with serial links for transmitting error detection codes for data transmitted on such configurable serial links.

Referring to FIGS. 10A to 10F, a start-up operation according to an embodiment is shown in a series of block diagrams. FIGS. 10A to 10F show a system 1012 having sections like those of FIGS. 5A to 5C. Accordingly, like sections are referred to by the same reference character but with leading digit values of "10" instead of "5".

Figure 10A:
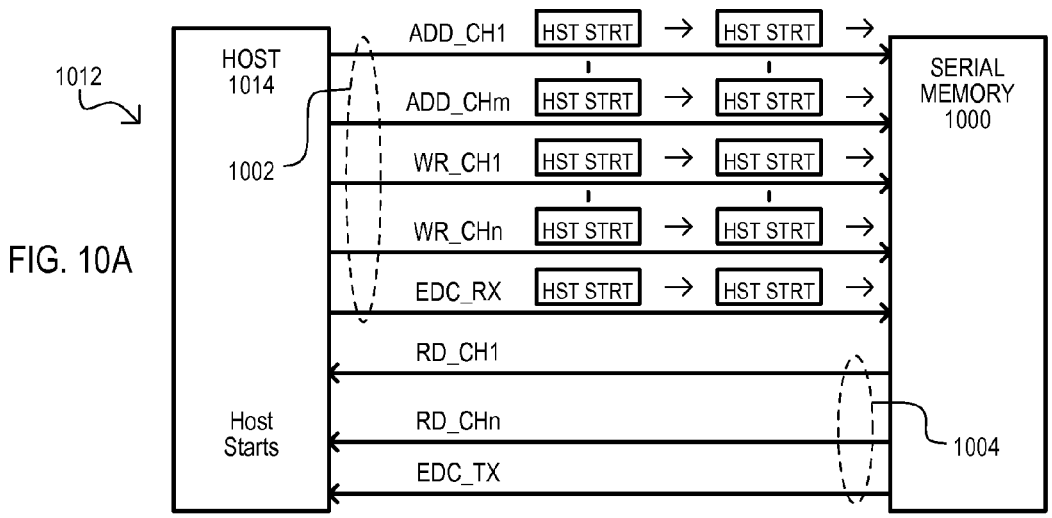
FIGS. 10A to 10F are block schematic diagrams of a system and start-up operation according to another embodiment.

FIG. 10A shows a start-up operation of a host device 1014 according to one particular embodiment. Upon a predetermined condition, including but not limited to a power-on or exit from a reset condition, a host device 1014 may transmit a sequence of predetermined values on serial links for reception by a serial memory device 1000. A host device 1014 may continue to transmit such sequence until an associated sequence of predetermined values are received from a serial memory device 1000.

In the embodiment shown in FIGS. 10A to 10F, a host device 1014 may transmit a host start-up transmission character HST_STRT on all outbound (i.e., transmit) serial links 1002. In one very particular embodiment, data may be transmitted between a host device 1014 and a serial memory device 1000 as 10-bit transmission characters, some of which may be encoded 8-bit data values. A host start-up transmission character HST_STRT may be a control code. Even more particularly, a host start-up transmission character HST_STRT may include a bit sequence intended to indicate character boundaries or a "comma" code. Even more particularly, an HST_STRT value may be a transmission character commonly referred to as K28.5, which may have a value "001111 1010" when transmitted during a negative running disparity, and the inverse "110000 0101" when transmitted during a positive running disparity. In an embodiment the K28.5 code may also be used as an idle or fill character, wherein such characters may be sent to maintain serial link synchronization when no address, data, or EDC information is being sent. In alternate embodiments other characters, codes, or values may be sent as an idle.

Figure 10B:
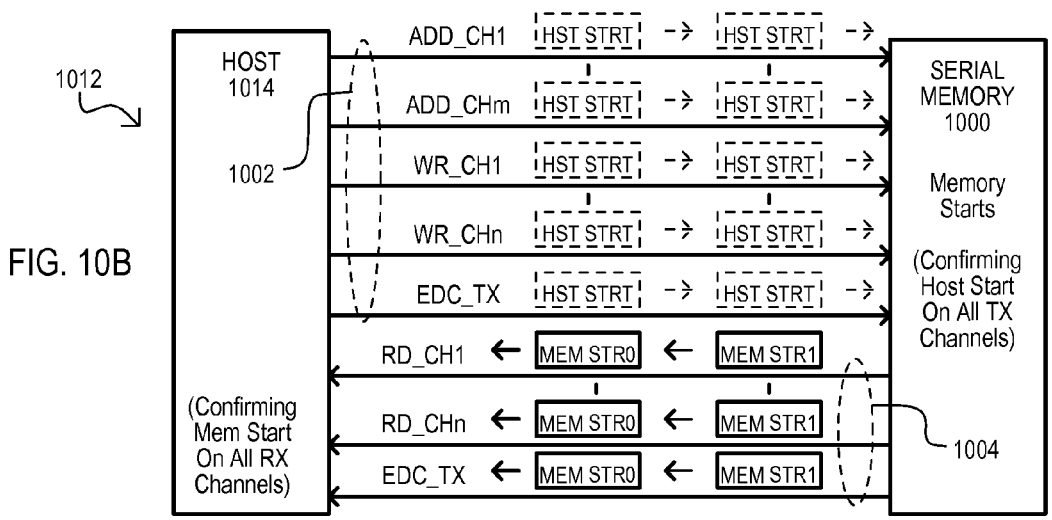

FIG. 10B shows an initial start-up operation of a serial memory device 1000 according to one particular embodiment. Upon a predetermined condition, including but not limited to a power-on or exit from a reset condition, a serial memory device 1000 may transmit a sequence of predetermined values on serial links for reception by a host device 1014. A serial memory device 1000 may continue to transmit such sequence until an associated sequence of predetermined start-up values are received from a host device 1014, like those shown in FIG. 10A.

In the embodiment shown in FIGS. 10A to 10F, a serial memory device 1000 may transmit alternating memory start-up transmission characters MEM_STR0/MEM_STR1 on all outbound (i.e., transmit) serial links 1004. In one very particular embodiment, data may be transmitted between a serial memory device 1000 and host device 1014 as 10-bit transmission characters, some of which may be encoded 8-bit data values. Memory start-up transmission characters MEM_STR0/MEM_STR1 may be control codes. Even more particularly, alternating start-up transmission characters (e.g., MEM_STR0/MEM_STR1) may be control codes K28.5 (previously described) and a control code referred to as K29.7, which may have a value "101110 1000" when transmitted during a negative running disparity, and the inverse "010001 0111" when transmitted during a positive running disparity.

Figure 10C:
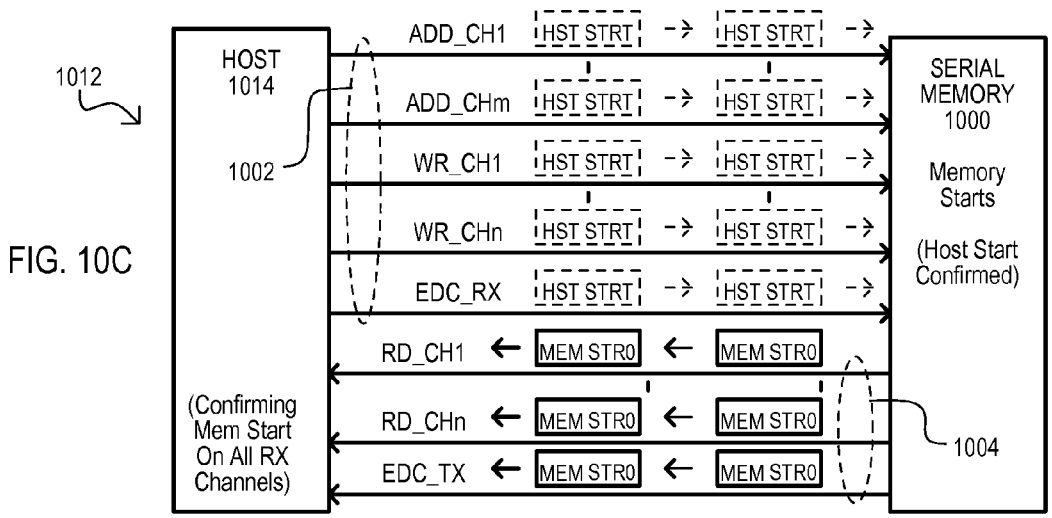

FIG. 10C shows a subsequent start-up operation of a serial memory device 1000 according to one particular embodiment. Upon detecting start-up transmission characters from a host device 1014, such as that shown in FIG. 10A, a serial memory device 1000 may transmit predetermined transmission characters to the host device 1014 that may be different from the initial memory start-up transmission characters.

In the embodiment shown in FIGS. 10A to 10C, upon detecting at least a predetermined number, e.g., four, consecutive incoming host start-up sequences of transmission characters on all incoming serial links, a serial memory device 1000 may switch from transmitting alternating memory start-up transmission characters MEM_STR0/MEM_STR1 to continuously transmitting memory start-up transmission character MEM_STR0. In one very particular embodiment, start-up transmission characters may switch from alternating between K28.5 (or an idle code) and K29.7 to transmitting just K28.5 characters (or the idle code).

In this way, in a start-up operation predetermined transmission characters may be transported between a host device and a serial memory device until the serial device has completed a start-up operation. It should be noted that the referenced startup sequences can include transmission characters or other markers to allow framing (i.e., detection of the character boundaries) within the deserializer/decoder function (equivalent to that in function 830 in FIG. 8) in each S/P block, as the receive function must be able to locate character boundaries to properly verify a start-up sequence.

Figure 10D:
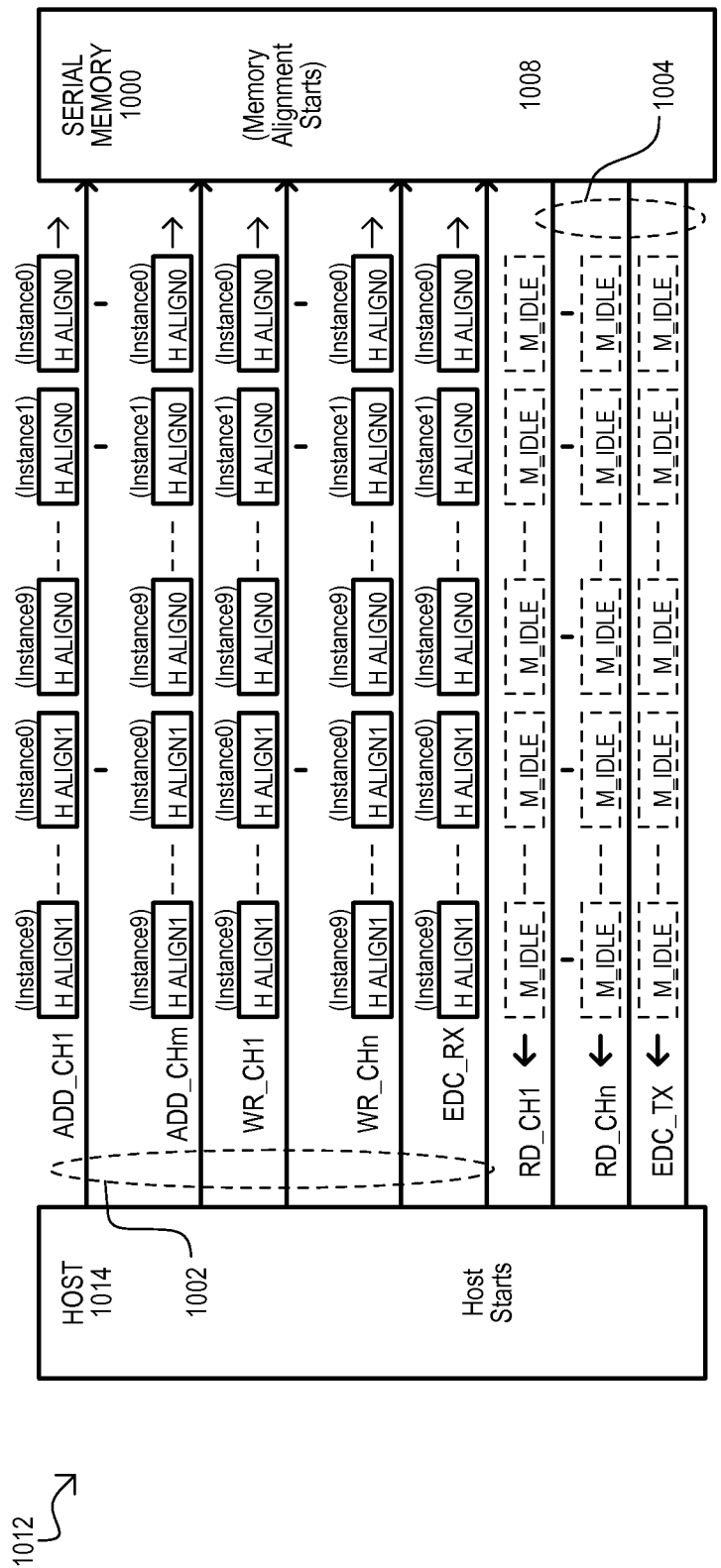
Figure 10E:
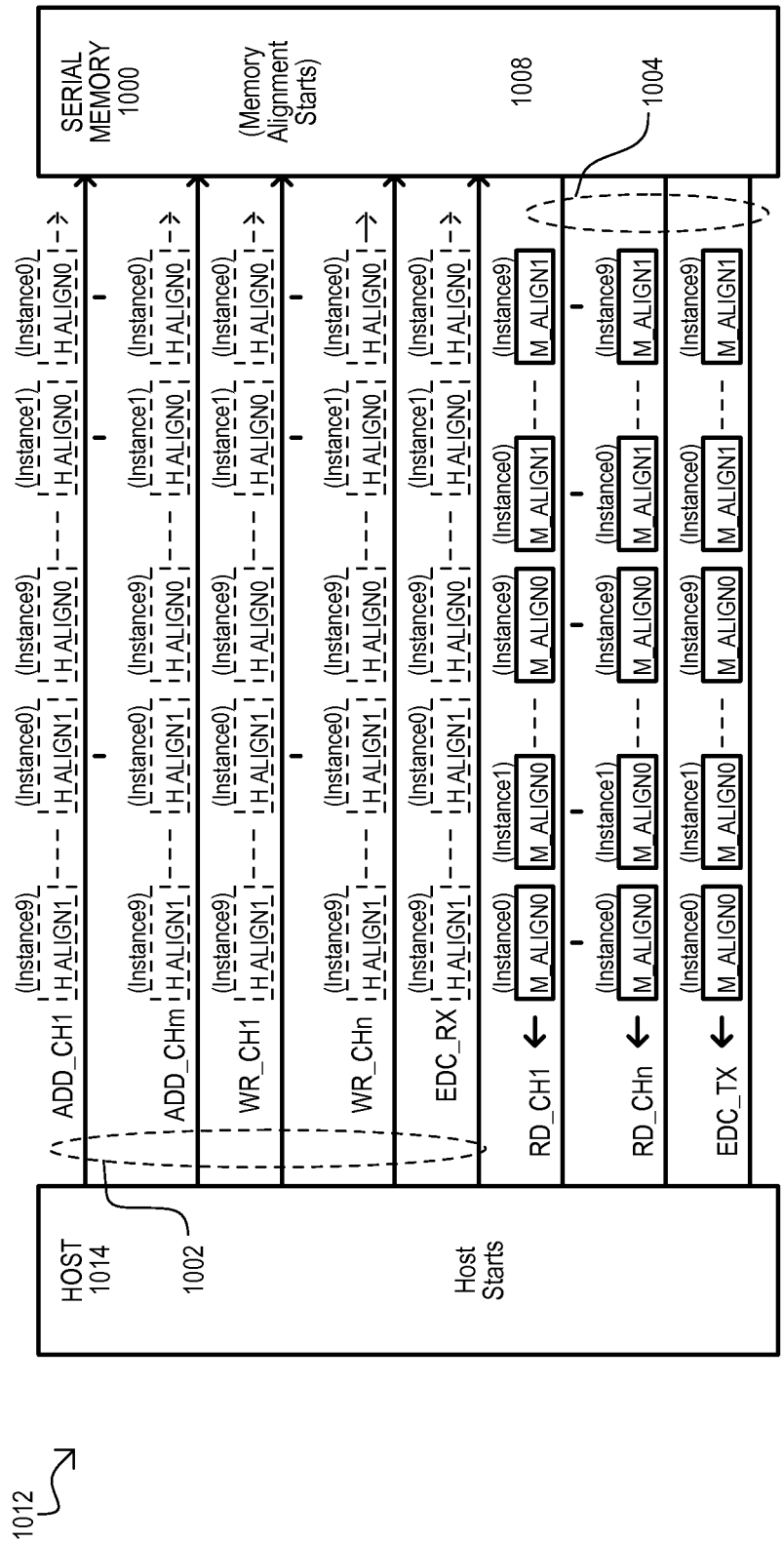
Figure 10F:
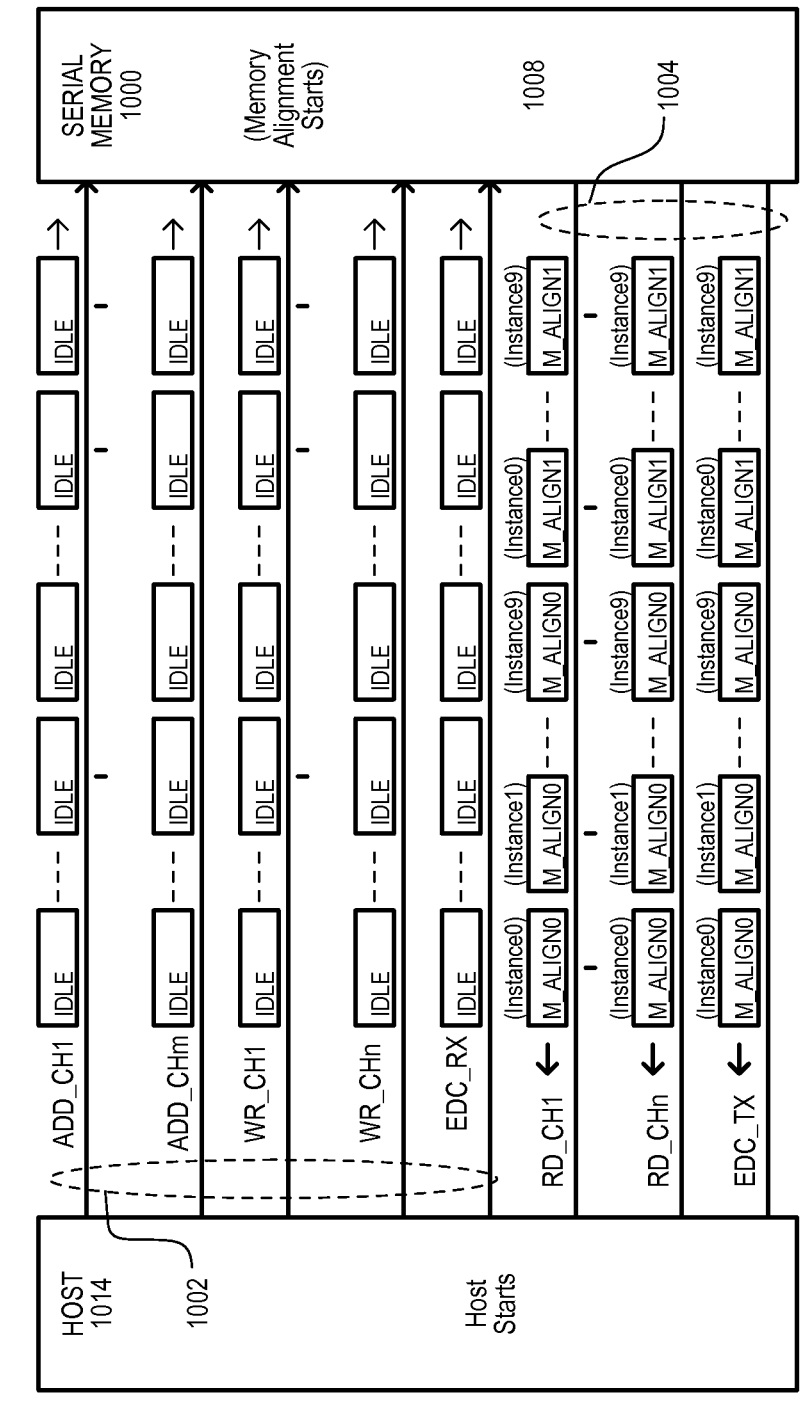

FIGS. 10D to 10F show a Frame or Word alignment operation of a host device 1014 and serial memory device 1000 according to one particular embodiment. Upon completion of a start-up, for example as shown in FIGS. 10A to 10C, a memory device 1000 and host 1014 may undergo Frame alignment operations to compensate for different transmission delays between the serial links 1002 carrying information between host device 1014 and serial memory device 1000, and/or for different transmission delays between the serial links 1004 carrying information between serial memory 1000 and the host device 1014. In such an operation, a host device 1014 may transmit predetermined sequences of transmission characters that enable serial memory device 1000 to determine the starting point of the same data unit of a Frame (e.g., FRAME0 and FRAME1 as shown in FIGS. 1B and 1C) on all serial links carrying information between the host device 1014 and the serial memory device 1000, and to align the multiple streams of data units such that all data units of the same Frame are aligned along the same Frame boundary. Likewise a similar Frame alignment process may occur on the data units transported across the serial links 1004 carrying information between the serial memory device 1000 and the host device 1014.

In the embodiment shown in FIGS. 10D to 10F, a host device 1014 may transmit host alignment transmission characters H_ALIGN0 and H_ALIGN1 on all serial links 1002 carrying information between host device 1014 and serial memory device 1000. In one very particular embodiment host alignment transmission characters may be 10-bit control codes not corresponding to an encoded 8-bit data value. Even more particularly, host alignment transmission character H_ALIGN0 may be the K28.5 code, and host alignment transmission character H_ALIGN1 may be the K27.7 code, where code K27.7 may have a value "110110 1000" when transmitted during a negative running disparity, and the inverse "001001 0111" when transmitted during a positive running disparity. As shown in FIG. 10D, host alignment transmission characters may be transmitted as a repeating sequence of, for example, 10 consecutive K28.5 codes followed by 10 consecutive K27.7 codes.

In response to host alignment transmission characters (e.g., H_ALING0 and H_ALIGN1) from a host device, a serial memory device may perform an alignment operation on the serial links. One example of an alignment operation is shown in U.S. Provisional Patent Application Ser. No. 61/228,070 by Gabriel Li, Bruce Barbara, and Edward Grivna, the contents of which are incorporated by reference herein.

Alignment operations are further described in additional embodiments below.

As further shown in FIG. 10D, when the serial memory device 1000 is receiving the host alignment character sequence as part of the Frame alignment process on links 1002 but has not yet completed this operation, it continues to output the K28.5 or other idle code on links 1004 to maintain link synchronization. The reception of this K28.5 or other idle code sequence by the host device 1014 also serves to further indicate that the host alignment process is not yet complete within the serial memory device 1000, and that the host device 1014 should continue transmission of the host alignment character sequence on all links 1002 from the host device 1014 to the serial memory device 1000.

FIG. 10E shows serial memory device 1000 operation following a successful host alignment operation. A serial memory device 1000 may transmit its own alignment transmission characters on all outgoing links.

In the embodiment shown in FIGS. 10D to 10F, serial memory device 1000 may transmit memory alignment transmission characters M_ALIGN0 and M_ALIGN1 on all on all serial links 1004 carrying information between memory device 1000 and host device 1014. In one very particular embodiment, memory alignment transmission characters M_ALIGN0 and M_ALIGN1 may be different 10-bit code values not corresponding to an encoded 8-bit data value. Even more particularly, a serial memory device 1000 may return a same alignment sequence as that sent by the host (e.g., 10 consecutive K28.5 codes followed by 10 consecutive K27.7 codes.

FIG. 10F shows an operation of a host device 1014 once it has completed a memory alignment operation. Upon completing a memory alignment operation on all serial links 1004 from serial memory device 1000 to host device 1014, host device 1014 may issue idle codes or start accesses to the serial memory device 1000 (e.g., read or write operations). FIG. 10F shows host device 1014 transmitting idle codes (IDLE). In response to reception of these IDLE codes, the serial memory device 1000 may terminate generation of the M_ALIGN0/M_ALIGN1 alignment sequence and may also respond with IDLE codes (not shown), thus completing the two steps of initialization.

Figure 11:
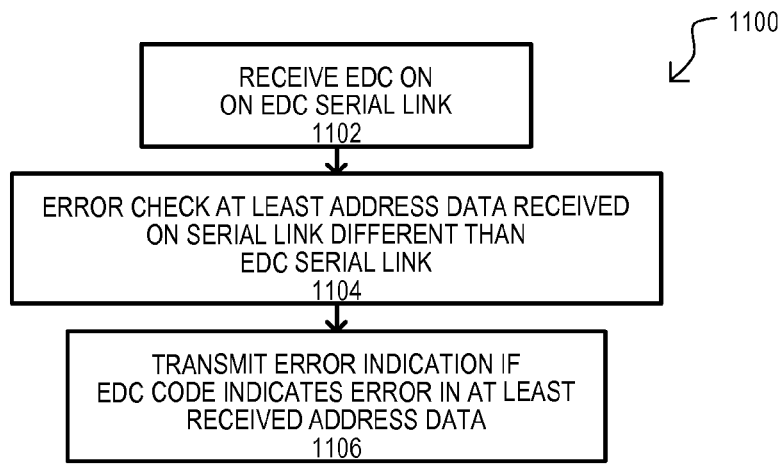
FIG. 11 is a flow diagram of a method according to an embodiment.

Referring to FIG. 11, a serial memory device method according to an embodiment is shown in a flow diagram and designated by the general reference character 1100. A method 1100 may include receiving at least a portion of an EDC value on an EDC serial link (box 1102). In some embodiments, such an action may include a serial memory device doing any of: detecting transitions on one or more lines, converting such serial data into parallel data, and/or decoding such parallel data into an EDC.

A method 1100 may also include error checking at least address data received on one or more serial links different than the EDC serial link (box 1104). Such an action may include receiving at least a portion of an address data on one or more links different than that which may receive all or a portion of an EDC value. That is, at least a portion of an EDC may not be included on the same serial transmission link as the corresponding address data.

A method 1100 may also include transmitting an error indication if the received error detection code (EDC) indicates an error in at least the address data (box 1106). Such an action may error check a read address in a read operation, and may check both a write address and corresponding write data in a write operation.

Figure 12:
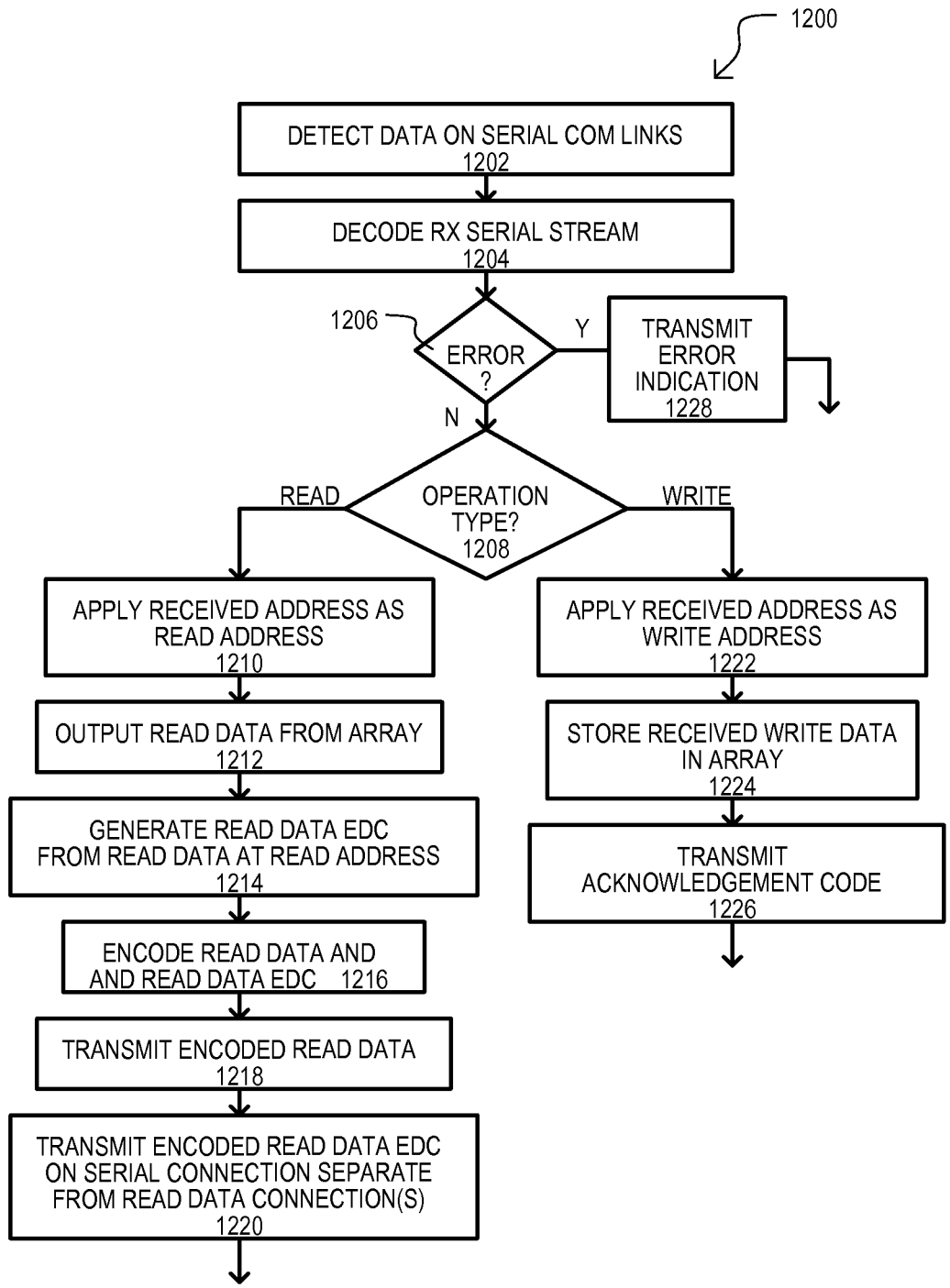
FIG. 12 is a flow diagram of a method according to a further embodiment.

Referring to FIG. 12, a serial memory device method according to another embodiment is shown in a flow diagram and designated by the general reference character 1200. A method 1200 may include detecting data on serial links (box 1202). Such an action may include detecting transitions on incoming serial links that indicate serial streams are being transmitted from a host device on multiple links.

In the embodiment shown, serial data streams may be decoded to derive received data units (box 1204). Such data units may include values for accessing memory locations (i.e., command data, address data, write data) as well as one or more error detection codes (EDCs) for such values.

Received data values may then be checked for errors (box 1206). If no error is determined to be found between received data and the corresponding EDC(s) (N from 1206), a method may determine an operation type (box 1208). Such an action may include determining if an operation is a read operation, a write operation, no operation, a diagnostic operation, or other operation. In one very particular embodiment, a read operation may be distinguished from a write operation by bits in a predetermined portion of a data unit that also includes address values.

If an operation is determined to be a read operation (READ from 1208), a method 1200 may apply a received address as a read address (box 1210). In response to such a read address, read data may be output from an array (box 1212). A read data EDC may be generated from such read data output from the array at the read address (box 1214).

Read data and a read data EDC may be encoded (box 1216). Such an approach may include encoding read data values of m-bits into encoded values of n-bit serial data units (where m<n).

A method 1200 may transmit encoded read data (box 1218). In one particular embodiment, such an action may include transmitting 10-bit characters on multiple serial communication links. In addition, in a certain time period, all or a portion of an encoded read data EDC may be transmitted on one or more serial communication links different from one(s) carrying the read data (box 1220). In one embodiment, such an action may enable read data EDC to arrive with corresponding read data on separate serial communication links, rather than having such an EDC arrive at the end of multiple units transmitted on a same link.

Referring still to FIG. 12, if an operation is determined to be a write operation (WRITE from 1208), a method 1200 may apply a received address as a write address (box 1222). Further, received write data may be stored in an array (box 1224). An acknowledgement may then be transmitted (box 1226). Such an action may include transmitting a predetermined control code.

Referring again to FIG. 12, if an error is detected in received data units (Y from 1206), an error indication may be transmitted (box 1224). Such an action may include transmitting a predetermined control code.

It is noted that actions in boxes 1206 and 1208 may occur in parallel. Further, in response to detecting an error in received data, an operation in progress (e.g., READ or WRITE) may be halted or otherwise prevented. As but a few examples, read data corresponding to the error case may not be accessed from an array, or such read data may be prevented from being transmitted from the serial memory device, or such read data may be received by the host device, but ignored due to the transmitted error indication. Similarly, write data corresponding to the error case may be prevented from being stored at an indicated write address.

Figure 13A:
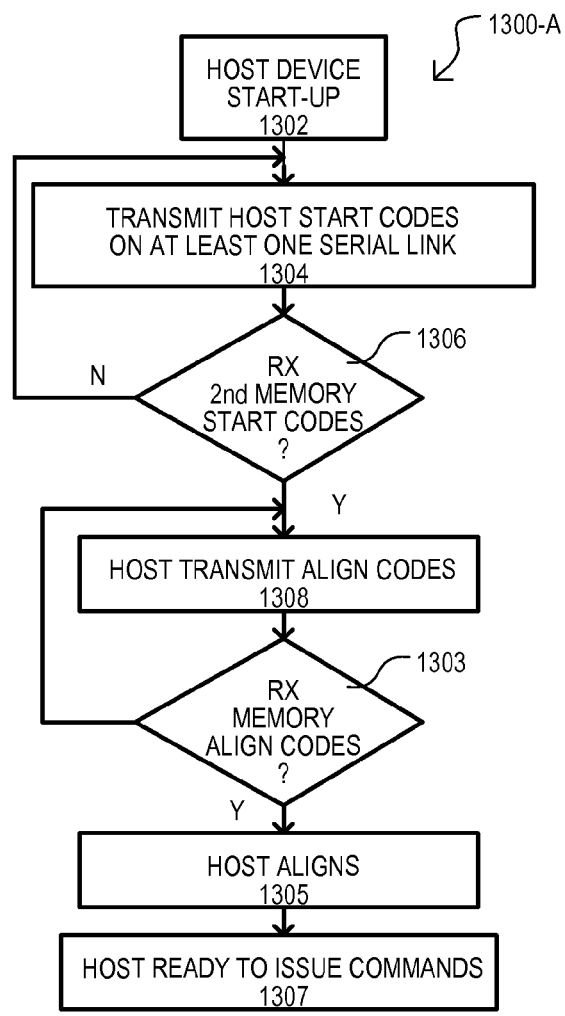
FIGS. 13A and 13B are flow diagrams of a method according to another embodiment.
Figure 13B:
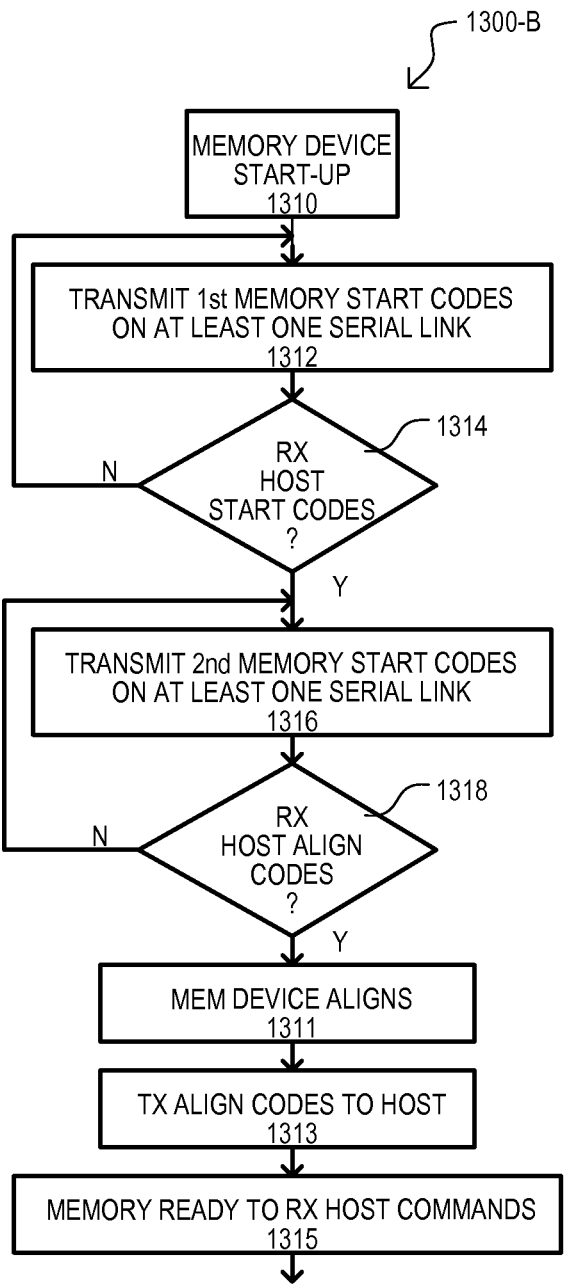

Referring to FIGS. 13A and 13B, methods according to additional embodiments are shown in flow diagrams, and designated by the general reference characters 1300-A and 1300-B. In the particular embodiments of FIG. 13A, a method 1300-A may include a host device starting up (box 1302). In one particular embodiment, such an action may include determining if power is being initially applied to a host device, if power has been interrupted to such a device, or if such a device is resetting itself to an initial state.

A method 1300-A may also include transmitting host start codes on at least one serial communication link to a memory device (box 1304). In one particular embodiment, such an action may include transmitting one or more predetermined start codes on multiple serial communication links. Even more particularly, such an action may include transmitting a transmission character suitable for character framing (e.g., 10-bit control code K28.5 or other comma-containing character) on all serial communication links from a host device to a memory device.

If a host device does not receive predetermined memory start codes (in this embodiment second memory start codes) (N from box 1306), a method 1300-A may continue to transmit host start codes (return to box 1304). If a host device does receive second memory start codes (Y from box 1306), a host device may transmit alignment codes (box 1308). Such an action may include a host device transmitting one or more codes that enable a memory device to account for varying delays between different communication links. In one particular embodiment, such an action may include transmitting one or more predetermined codes sequentially on all serial communication links received by a memory device. Even more particularly, such an action may include transmitting 10 consecutive K28.5 codes followed by 10 consecutive K27.7 codes.

If a host device does not receive predetermined memory alignment codes (N from box 1303), a method 1300-A may continue to transmit host alignment codes (return to box 1308). If a host device does receive memory alignment codes (Y from box 1303), a host device may perform its own alignment operation (box 1205), and then may be ready to issue commands (box 1207).

Referring to FIG. 13B, a memory device portion 1300-B may include a memory device starting up (box 1310). In one particular embodiment, such an action may include determining if power is being initially applied to a memory device, if power has been interrupted to such a device, or if such a device is resetting itself to an initial state.

A memory portion 1300-A may also include transmitting first memory start codes on at least one serial communication link to a host device (box 1312). In one particular embodiment, such an action may include transmitting predetermined codes on multiple serial communication links. Even more particularly, such an action may include transmitting alternating predetermined transmission characters (e.g., 10-bit control codes K28.5 and K29.7) on all serial transmission communication links from a memory device to a host device, wherein at least one of such predetermined transmission characters is suitable for character framing (e.g., 10-bit control code K28.5 or other comma-containing character).

If host start codes are not received (N from box 1314), a method 1300-B may continue to transmit first memory start codes (return to box 1312). If host start codes are received (Y from box 1314), a memory device may include transmitting second memory start codes on at least one serial communication link to a host device (box 1316). In one particular embodiment, such an action may include transmitting a predetermined transmission characters on multiple serial communication links. Even more particularly, such an action may include consistently transmitting one predetermined code (e.g., 10-bit control codes K28.5) having previously alternated between such a code and another code.

If host alignment codes are not received (N from box 1318), a method 1300-B may continue to transmit second memory start codes (return to box 1316). If host alignment codes are received (Y from box 1318), a memory device may perform an alignment operation (box 1311) to account for varying delays between different communication links. A memory device may then transmit alignment codes to a host (box 1313). A memory device may then be ready to receive commands (e.g., read or write) from a host.

Figure 14A:
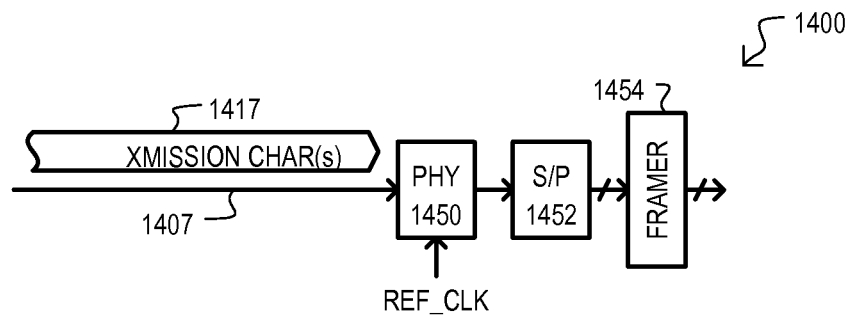
FIGS. 14A and 14B are diagrams showing bit synchronization operations that may occur in embodiments.
Figure 14B:
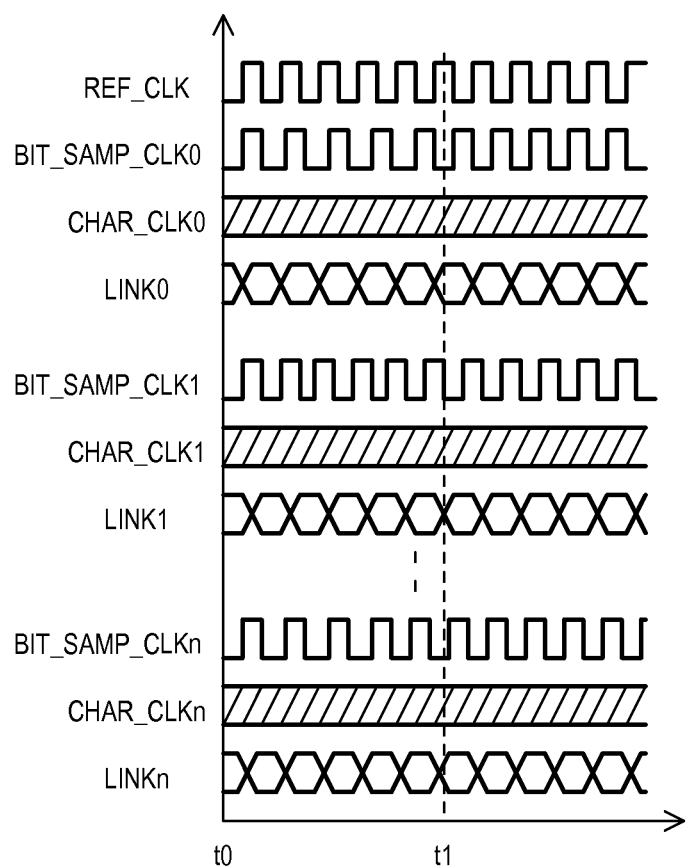

Referring now to FIGS. 14A and 14B, serial interface operations that may be included in the various embodiments will be described in a block schematic diagram and timing diagram.

FIG. 14A shows a portion of a serial-to-parallel path 1400, like that shown in FIG. 8. Transmission characters may provide a serial bit stream 1417 to PHY section 1450. In one embodiment, PHY section 1450 may receive a reference clock REF_CLK that is synchronous with, but not necessarily in phase with, bit stream 1417 (e.g., a host device is transmitting at a same frequency as reference clock REF_CLK). In one embodiment, a reference clock REF_CLK may be generated by a clock multiplier, or the like, from a slower running reference clock received from an external source, or generated by an oscillator circuit. Within PHY section 1450, a bit sample clock may be generated from a reference clock REF_CLK that is phase-aligned with a received bit stream 1417 during a start-up operation such as that shown in FIG. 10A through 10C.

FIG. 14B shows generation of bit sample clocks for a number of serial communication links (LINK0 to LINKn). FIG. 14B shows a reference clock (REF_CLK), and three waveforms for each link: BIT_SAMPCLKi, CHAR_CLKi and LINKi (where 1 corresponds to a link number). Waveforms BIT_SAMP_CLKi show a receiving device bit sample clock generated from reference clock (REF_CLK). Waveforms CHAR_CLKi shows a "character clock" that indicates where characters start/end in a bit stream. Waveforms LINK/ show bit streams received on links.

Referring still to FIG. 14B, at time t0, upon reception of a serial bit stream, any of bit sample clocks (BIT_SAMP_CLKi) may be out of phase with a respective bit stream on the corresponding link LINKi. In response to reference clock REF_CLK and transitions in each serial stream, bit sample clocks (BIT_SAMP_CLKi) may be phase shifted or otherwise appropriately aligned in time with the corresponding serial stream to allow valid sampling of the bits transmitted on the serial link. In some embodiments, each link may include a corresponding receive phase lock loop (PLL) circuit to pull a bit sample clock into alignment with a bit stream. In other embodiments, multiple sample clocks may be generated (e.g., via delay lock loop (DLL) circuits and/or multiplier circuit on a delay line), and an appropriate phase selected as a bit sample clock. At this time, character clocks CHAR_CLKi may be considered invalid.

In the embodiment of FIG. 14B, by time t1, all bit sample clocks (BIT_SAMP_CLKi) may be phase aligned with their respective received bit streams. At this time, since the boundaries of characters within the serial bit stream are still unknown, character clocks CHAR_CLKi may still be considered invalid.

Once bit sample clocks have been appropriately aligned and bits are being extracted from the received serial bit streams, valid character clocks may be generated. In one embodiment, one or more characters may be transmitted on each serial link having a predetermined bit pattern. From such a bit pattern, a receiving device may determine where character boundaries occur within a bit stream. Following determination of character boundaries within the Framer block 1454, this may allow a receiving device to "align" (e.g., logically group) data from characters received on different links, where such characters may not received simultaneously.

Figure 15A:
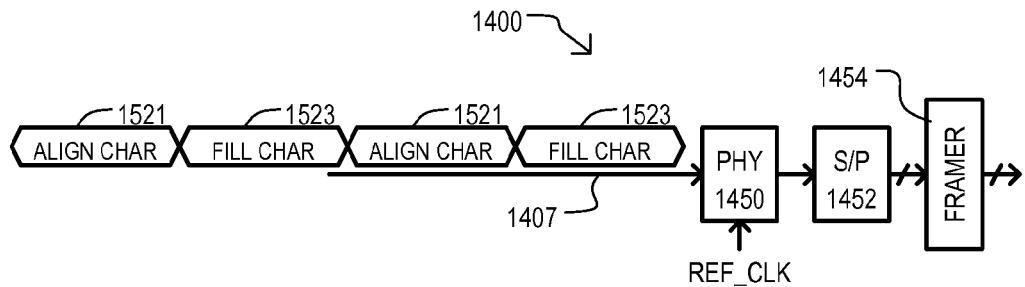
FIGS. 15A and 15B are diagrams showing character synchronization operations according to embodiments.
Figure 15B:
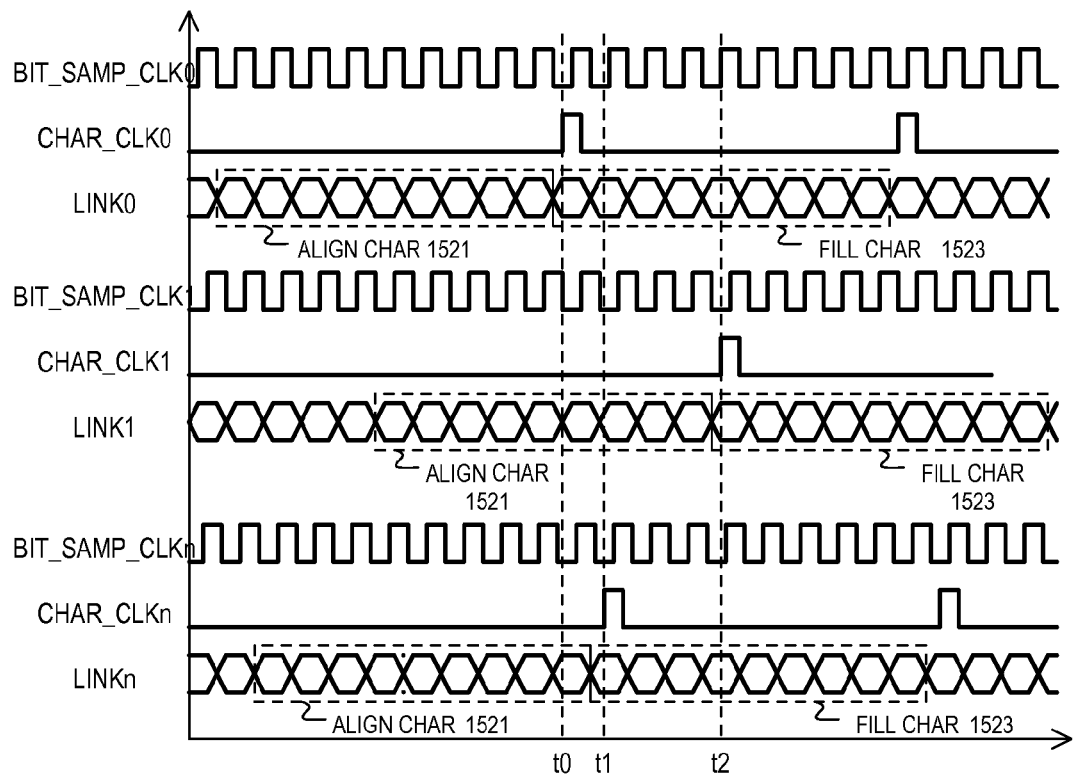

Referring now to FIGS. 15A and 15B, generation of aligned character clocks according to an embodiment is shown in a block schematic diagram and timing diagram.

FIG. 15A shows a same portion of a serial-to-parallel path 1400 as that of FIG. 14A. In the embodiment shown, transmission characters received on a serial link 1407 may include alternating alignment characters 1521 and fill characters 1523. In an alternate embodiment the fill characters may also be alignment characters.

FIG. 15B shows the generation of character clocks CHAR_CLKi corresponding to each link. In response to alignment characters 1521, a character start (or ending) point can be determined for each link. It is noted that in FIG. 15B, characters on LINK0 are indicated as arriving first, followed by characters on LINKn, followed by characters on LINK1. Consequently, CHAR_CLK0 is active at time t0, CHAR_CLKn is active at time t1, and CHAR_CLK1 is active at time t2. Once the character boundaries are so identified, the character clocks may occur continuously at the character boundaries and are generated by simple fixed count or division of the associated bit sample clocks. While shown in FIG. 15B as having a highly asymmetric duty cycle, the duty cycle of the CHAR_CLKi signals may be of any mark/space ratio including equal parts high and low.

In one particular embodiment, transmission characters may be 10-bit characters including control codes and encoded 8-bit data values. An alignment character may be control code K28.5, and a fill character may be control code K29.7.

Character clocks generated for each link may be utilized to write data carried on each link into a corresponding buffer. Data may then be read from the buffers, substantially simultaneously, for further processing within a receiving device.

Figure 16:
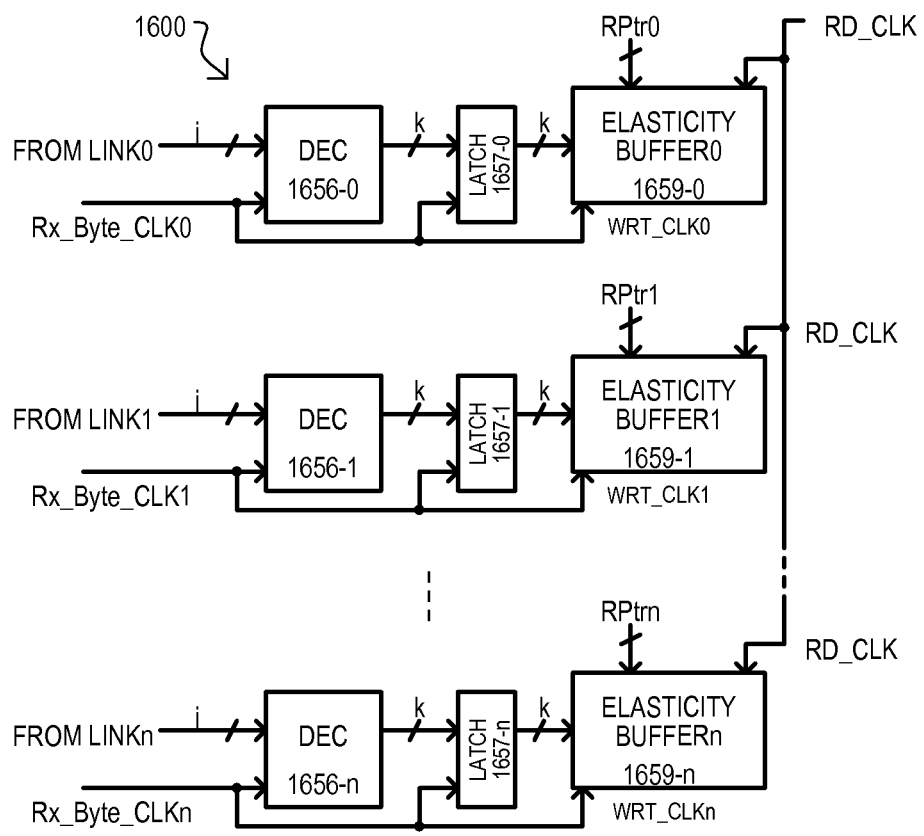
FIG. 16 is a block schematic diagram showing decode and buffering circuits according to an embodiment.

FIG. 16 shows decoding and buffer circuits 1600 corresponding to serial communication links LINK0 to LINKn. Circuits 1600 include decoder circuits 1656-0 to -n, latch circuits 1657-0 to -n, and "elasticity" buffers 1659-0 to -n.

Decoder circuits (1656-0 to -n) may decode transmission characters of j parallel bits received from a corresponding serial link, into data values and control codes of k bits. Transmission characters of j-bits may be clocked into decoder circuits (1656-0 to -n) by corresponding "byte" clocks (Rx_Byte_CLK0 to -n). Byte clocks (Rx_Byte_CLK0 to -n) may be generated from character clocks, such as those shown as CHAR_CLK0 to -n. In one particular embodiment, decoder circuits may decode 10-bit transmission characters into 8-bit data values or control codes. In another embodiment the byte clocks and character clocks may be the same signal.

Latch circuits (1657-0 to -n) may latch k-bit decoded values output from decoder circuits (1656-0 to -n). Latching circuits (1657-0 to -n) may be enabled by the corresponding byte clock (Rx_Byte_CLK0 to -n).

Elasticity buffers (1659-0 to -n) may buffer decoded values originating on different links, and enable such data values to be read out together as a time-aligned group or word. In FIG. 16, data values may be written into elasticity buffers (1659-0 to -n) according to the corresponding byte clock (Rx_Byte_CLK0 to -n). Thus, data values may be written into different elasticity buffers (1659-0 to -n) at different times in the event serial links introduce different delays between the links. In contrast, data may be read out from elasticity buffers (1659-0 to -n) at substantially the same time, according to a read clock RD_CLK. However, as will be described in more detail below, read pointers (RPtr0 to RPtrn) for each elasticity buffers (1659-0 to -n) may ensure that read operations are "aligned" (e.g., represent a temporal grouping of the data as originally transmitted from a host). In one embodiment, elasticity buffers (1659-0 to -n) may be first-in-first-out (FIFO) type memories.

Referring now to FIGS. 17A to 17F an alignment operation for elasticity buffers, like those of FIG. 16, will now be described. FIGS. 17A to 17F show elasticity buffers (1659-0 to -n), write pointers for such buffers (WPtr0 to -n), and read pointers (RPtr0 to -n) for such buffers. Write pointers (WPtr0-n) may identify write locations for received data values. It is understood that write operations may vary in time between elasticity buffers (1659-0 to -n).

In a buffer alignment operation, transmission characters may be sent on all links that have been previously designated as alignment codes (e.g., H_ALIGN0/1 and M_ALIGN0/1 as shown in FIGS. 10D through 10F). In particular, a consecutive sequence of a first alignment code may be followed by a consecutive sequence of a second alignment code. A transition from one code to another within the buffers may identify alignment differences between links. Further, the transmission of consecutive sequences of a same code may ensure alignment occurs in the proper direction (e.g., a link with a longest delay is not interpreted as a link with the shortest delay, and vice versa).

Figure 17A:
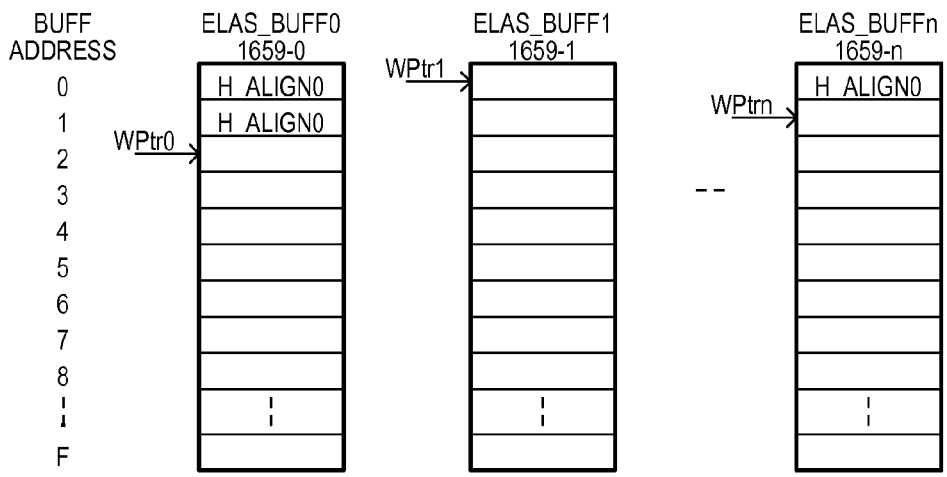

Referring to FIG. 17A, first alignment codes may be transmitted on multiple links. Such a first alignment code may be decoded into a value H_ALIGN0. As such values are received on each link, they may be written into sequential locations in each elasticity buffer (1659-0 to -n) at locations indicated by write pointers (WPtr0-n). As each location is written with a new decoded character, the write pointer may be advanced to the next location in the elasticity buffer.

FIG. 17A depicts exemplary elasticity buffers ELAS_BUFF0-*n* (1659-0 to -n) each having, for example, sufficient storage for 16 data units. The storage locations within these elasticity buffers are shown having addresses of 0 through F (0000 through 1111 binary). Received and decoded characters are shown being written into their respective elasticity buffer as they become available. As per the example in FIG. 15B, where time offsets in the serial streams have characters being received first on LINK0, followed by LINKn, and finally on LINK1, buffer ELAS_BUFF0 (1659-0) is shown having accepted more data units than ELAS_BUFFn (1659-*n*), which is also shown having received more data units than ELAS_BUFF1 (1659-1).

Figure 17B:
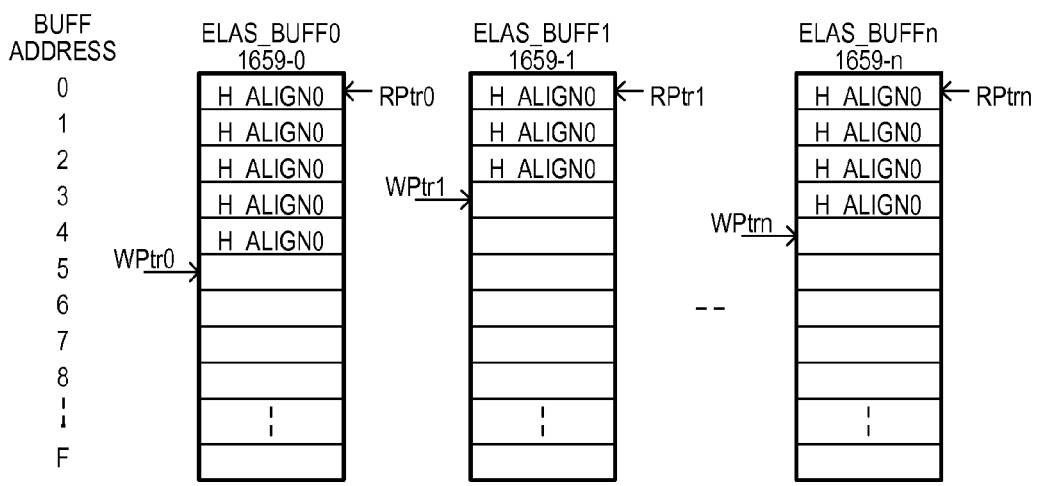

Referring to FIG. 17B, read pointers (RPtr0-*n*) in each elasticity buffer may be set to arbitrary initial locations. They may be held at these locations until the differentiation point is identified in the received character stream. Per FIG. 17B these read pointers are held at the starting address of each buffer or address 0. In an alternate embodiment the read buffers may be allowed to advance on every cycle of the read clock RD_CLK as shown in FIG. 16.

Figure 17C:
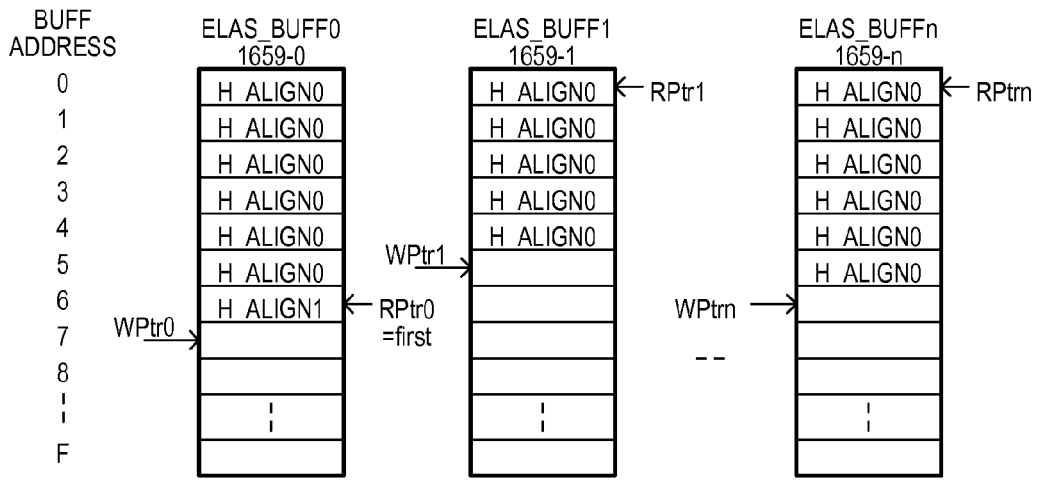

Referring to FIG. 17C, following detection of the transition between a first alignment code type and a second alignment code type being written into an elasticity buffer, the read pointer may be set to the location where the transition occurred. This may be done by detecting the presence of the H_ALIGN1 character just prior to it being written, and transferring the associated write pointer to the read pointer. Since the transition point is only known at this time for one of the n elasticity buffers, it is not yet possible to allow read operations to occur from the buffer(s), and thus the read pointer may be prevented from advancing on consecutive cycles of the RD_CLK. In an alternate embodiment, the value of the write pointer when the transition code is written to the buffer may be captured in a separate register and the read pointer may be allowed to continuously advance.

Referring again to FIG. 17C, read pointer RPtr0 may correspond to a first occurrence of a second alignment code (H_ALIGN1) following a consecutive sequence of a first alignment code (H_ALIGN0). Such a first occurrence of a change in alignment codes may indicate a "leading buffer" with respect to the other elasticity buffers (in which a change in alignment code has not yet been detected). In the embodiment of FIG. 17C, the corresponding read pointer (RPtr0) may be identified relative to the other read pointers (RPtr0=first).

Referring to FIG. 17D, additional data units have been received into each elasticity buffer, but not all read pointers for buffers that have yet detected a change in alignment code may thus not be advanced with respect to the read pointer(s) of leading buffer(s). In the embodiment of FIG. 17D, read pointer RPtr0 may correspond to a change in alignment codes and revised pointer location in buffer ELAS_BUFF0, and RPtrn may correspond to a change in alignment codes and revised pointer location in buffer ELAS_BUFFn. Thus, read pointer (RPtrn) location may be noted relative to the leading buffer pointer(s) (RPtrn=first).

Changes in alignment code may detected in this fashion to identify alignment differences between all elasticity buffers, and read pointers may be set to compensate for such differences. FIG. 17E shows read pointer RPtr1 being changed in this manner to be aligned with respect to the other read pointers (RPtr1=first).

Once all read pointers are positioned to be aligned with changes in alignment codes, the read pointers may advance together to access buffer locations in parallel as the contents of the elasticity buffers are read out and processed. In the exemplary data reception shown in FIGS. 17A through 17F, the transition from H_ALIGNB0 to H_ALIGN1 codes was all detected at the same location (e.g., address 6) in each of the associated elasticity buffers (1659-0 through 1659-*n*) but offset in time of detection. These same transition detections may also occur at offset positions in each of the elasticity buffers.

FIG. 17F shows read pointers after they have advanced three more positions from that shown in FIG. 17E. It is noted that the read pointers retain offset positions established by detected changes in alignment codes. Since the read pointers change relative to the read clock RD_CLK, any offset present when they were first detected as all pointing to the transition location is maintained until alignment is lost due to external events (e.g., loss of power, device reset).

Figure 18A:
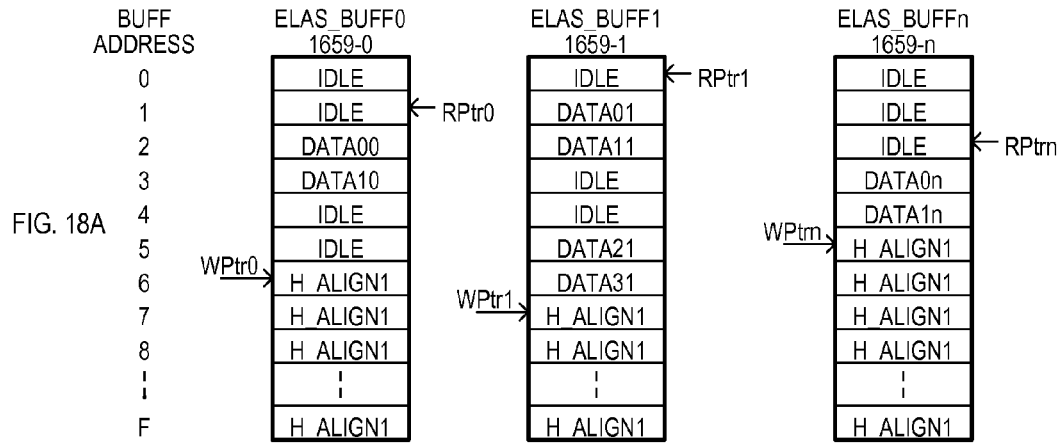
FIGS. 18A and 18B are diagrams showing buffer operations following word synchronization.
Figure 18B:
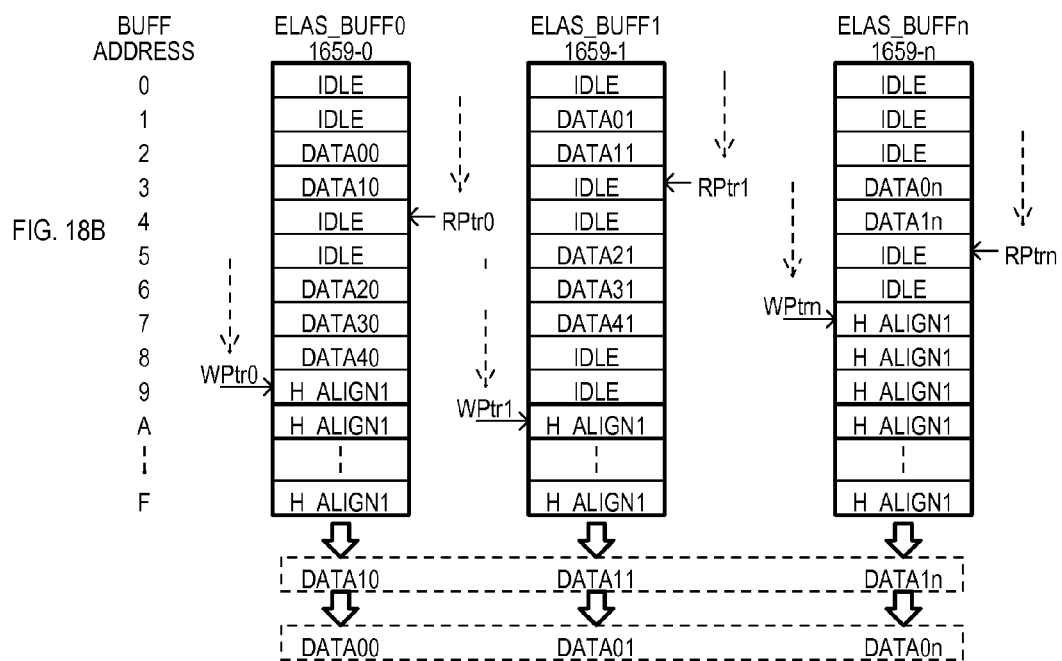

Following an alignment operation, data values stored in elasticity buffers (1659-0 to -n) may be read out based on positions of read pointers (RPtr0 to -n), to thereby compensate for misalignment arising from transport over links. FIGS. 18A and 18B show examples of elasticity buffers operations following an alignment operation like that shown in FIGS. 17A to 17F.

Referring to FIG. 18A, data values have been written into elasticity buffers (1659-0 to -n) by write pointers (WPtr0 to -n) advancing. In the example shown here, the write pointers (WPtr0 to -n) and read pointers (RPtr0 to -n) have different offsets from those in FIGS. 17A through 17F.

FIG. 18B shows data values readout from the elasticity buffers (1659-0 to -n) as the locations of read pointers (RPtr0 to -n) are advanced. Accordingly, while data values DATA00, DATA01 . . . DATA0*n* may have been written into elasticity buffers (1659-0 to -n) at different times, such values are read out substantially simultaneously.

Referring still to FIGS. 18A and 18B, fill codes (IDLE) may indicate to a device that memory operation (e.g., reads/writes) are not to take place. In some embodiments, such values may be stored in elasticity buffers (1659-0 to -n) and not acted upon when read out from elasticity buffers (1659-0 to -n).

Figure 19:
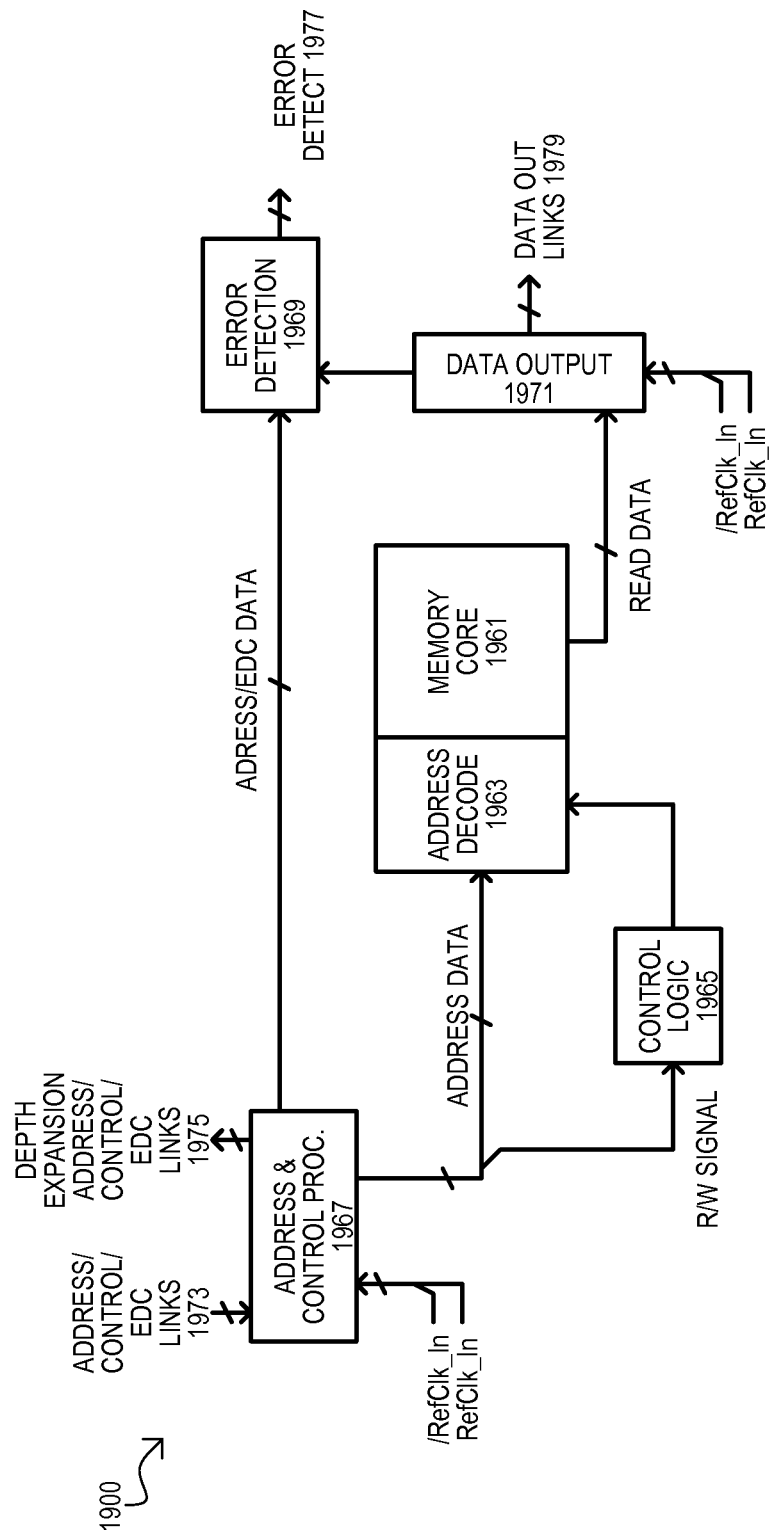
FIG. 19 is a diagram of components of a memory architecture utilized in a read operation.

Referring to FIG. 19, components of a memory architecture utilized during a read operation are shown in a block diagram and designated by the general reference character 1900. Components 1900 may include a memory core 1961, an address decoder 1963, control logic 1965, address and control section 1967, an error detection section 1969, and a data output section 1971.

Address and control section 1967 may include receive serial interfaces for connection one or more receive serial communication links 1973 carrying address data, control data, and error detection (EDC) data for such address and control data. In the embodiments shown, address and control section 1967 may also include transmit serial interfaces for connection to transmit serial communication links 1975 to enable such address and control data to be sent to another like memory device to enable memory depth expansion of a system. Address and control section 1967 may perform de-serialization, decoding, and alignment functions for data received on links 1973 according to complementary reference clocks /RefClk_In and RefClk_In. Such operations may occur as described herein and equivalents. In a read operation, address and control section 1967 may receive transmission characters that decode into data units containing address data, command data, and error detection data.

Address and control section 1967 may output address/control data and corresponding EDC data to error detection section 1969. In response to such values, error detection section 1969 may determine if an error has been detected. Results of such an error detection operation may be serialized and output on one or more error detect serial communication links 1977. In a read operation, error detection section 1969 may output one value in the event an error is detected and another value in the event an error is not detected.

Address and control section 1967 may also output address data to address decoder 1963, and control data (R/W SIGNAL) to control logic 1965. Control logic 1965 may enable a particular operation (e.g., read or write) in response to control data (R/W SIGNAL). Address decoder 1963 may decode received address values to access a location within memory core 1961. In a read operation, memory core 1961 may output read data to data output section 1971.

Data output section 1961 may include interface circuits for encoding and serializing read data for output on one or more data out serial communication links 1979. Data output section 1961 may also present read data to error detection circuit 1969. This EDC circuit may generate associated EDC data based on the read data and, following encoding and serialization, may output same one or more error detect serial communication links.

Figure 20:
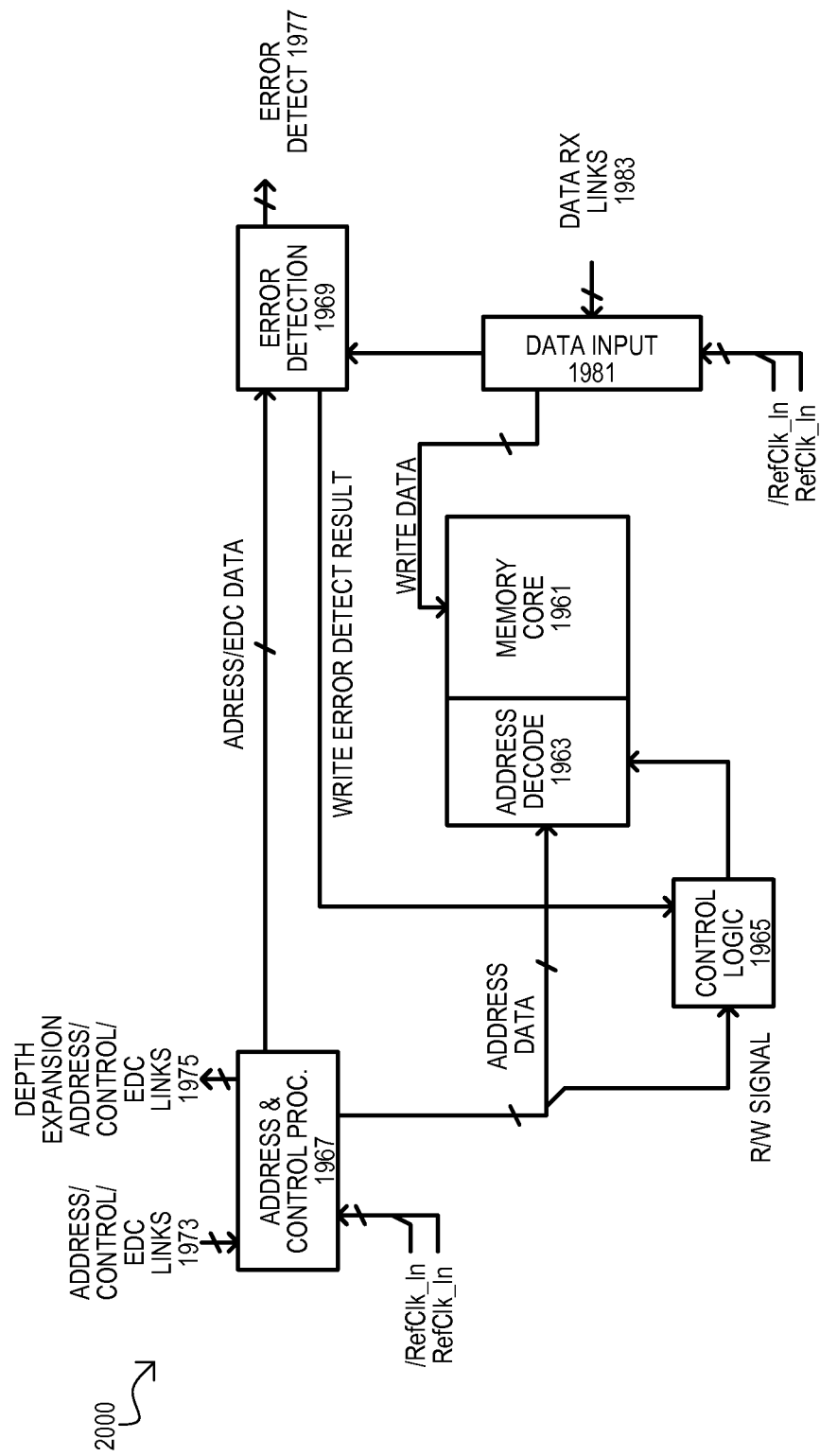
FIG. 20 is a diagram of components of a memory architecture utilized in a write operation.

Referring to FIG. 20, components of a memory architecture utilized during a write operation are shown in a block schematic diagram and designated by the general reference character 2000. Components 2000 may include components like those shown in FIG. 19. Such like components will be referred to by the same reference character. Unlike FIG. 19, a write operation may utilize a data input section 1981.

Address and control section 1967 may perform de-serialization, decoding, and alignment functions for data received in links 1973 according to complementary reference clocks /RefClk_In and RefClk_In. Such operations may occur as described herein and equivalents. In a write operation, address and control section 1967 may receive transmission characters that contain address data, command data, and error detection data.

Data input section 1981 may receive write data values on write data links 1983. Data input section 1981 may perform de-serialization, decoding, and alignment functions for write data received on links 1973 according to complementary reference clocks /RefClk_In and RefClk_In. To ensure that the proper write data is associated with the correct write address, it may be necessary for the alignment operation, such as that shown in FIGS. 17 and 18, occur on the elasticity buffers present in both the address and control block 1967 and the data input block 1981 at the same time. In some embodiments these two blocks may be combined into a common block that processes the reception and alignment of all address, control, write data, and EDC data.

In response to address, command, and EDC data from address and control section 1967, as well as write data values from data input section 1981, error detection section 1969 may determine if an error has been detected. Results of such an error detection operation may be serialized and output on one or more error detect serial communication links 1977. As in the case of a read operation, in a write operation error detection section 1969 may output one value (e.g., NAK) in the event an error is detected and another value in the event an error is not detected. Error detection section 1969 may also output a write error detect result to control logic 1965.

Address and control section 1967 may output address data to address decoder 1963, and control data (R/W SIGNAL) to control logic 1965. Control logic 1965 may enable a particular operation (e.g., read or write) in response to control data (R/W SIGNAL) and a write error detect result. Thus, if a write error detect result indicates an error, a write operation may not be performed.

Address decoder 1963 may decode received address values to access a location within memory core 1961 to enable write data from data input section 1981 to be written into the specified location. However, as noted above, if a write error detect result indicates an error, a write operation may not be performed.

Figure 21:
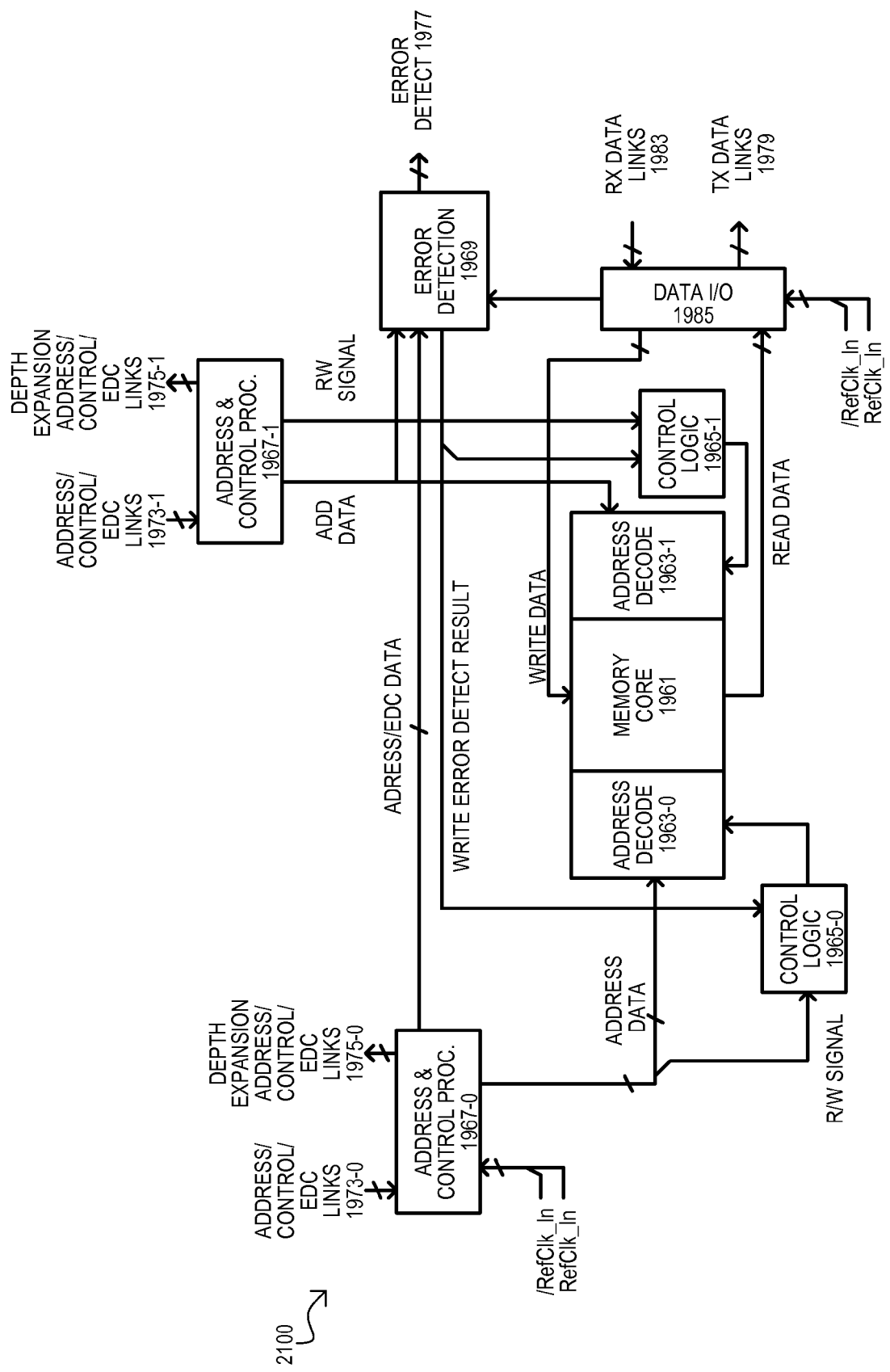
FIG. 21 is a diagram of components of a memory architecture that may perform read and write operations concurrently.

Referring to FIG. 21, components of a memory architecture that may perform read and write operations concurrently is shown in a block diagram and designated by the general reference character 2100. Components 2100 may include components like those shown in FIGS. 19 and 20. Such like components will be referred to by the same reference character.

Unlike FIGS. 19 and 20, FIG. 21 includes two address and control sections 1967-0/1, two control logic sections 1965-0/1, and two address decoders 1963-0/1. Accordingly, while a read operation may be initiated at one address and control section (e.g., 1967-0/1) a write operation may be initiated at the other address and control section (e.g., 1967-1/0).

Further, an error detection circuit 1969 may perform error detection functions for both types of accesses. A data input/output section 1985 may include both a data output section (like that shown as 1971 in FIG. 19) as well as a data input section (like that shown as 1981 in FIG. 20).

Figure 22:
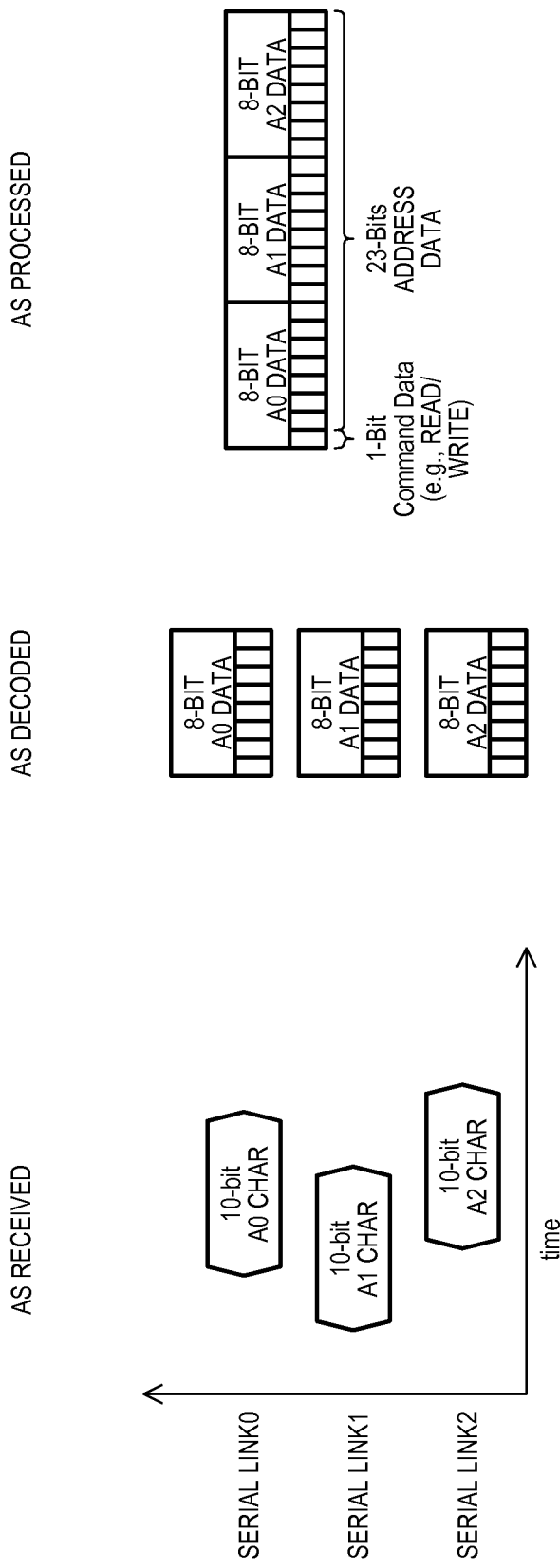
FIGS. 22A to 22C are diagrams showing address and command data formats according to one embodiment.

Referring now to FIGS. 22A to 22C, address and command data formats according to one embodiment are shown in a series of diagrams.

FIG. 22A is a timing diagram showing how address and command values may be received on different serial communication links as encoded 10-bit data values A0 CHAR, A1 CHAR and A2 CHAR.

FIG. 22B is a diagram showing how encoded address values A0 CHAR, A1 CHAR and A2 CHAR may be decoded into 8-bit (byte) values A0 DATA, A1 DATA and A2 DATA.

FIG. 22C is a diagram showing how 8-bit data values may be processed within a core portion of a memory device. Received bytes may be combined into a 24-bit value, where a portion of the bits (in this example one bit) represent command information, while the remaining bits represent address information.

Figure 23:
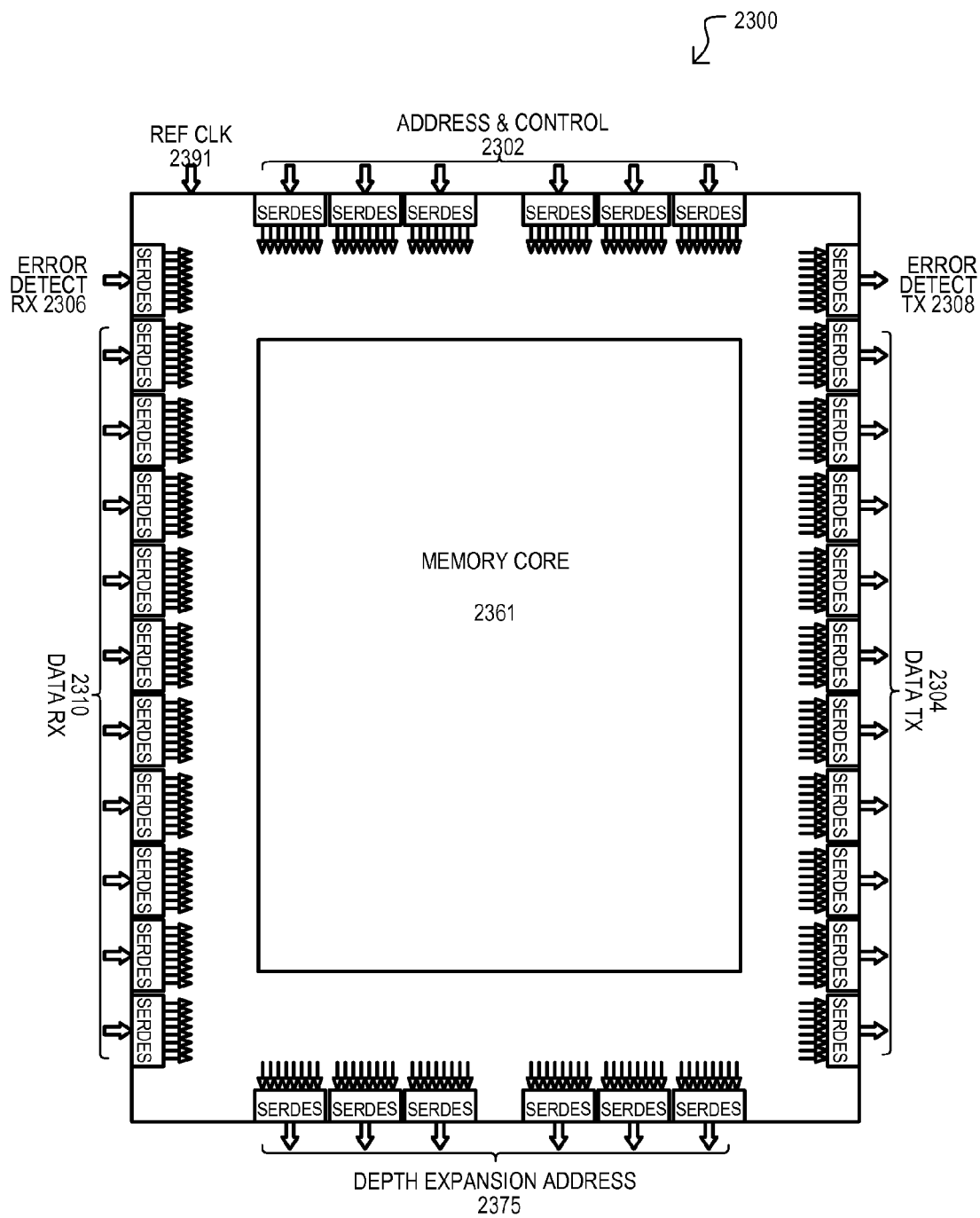
FIG. 23 is a top plan view of a memory device according to an embodiment.

Referring to FIG. 23 a block diagram of a memory device in accordance with an embodiment is shown in a top plan view. Memory device 2300 may include a memory core 2361, error detection RX link 2306, reference clock input 2391, address and control RX links 2302, error detection TX link 2308, data RX links 2310, data TX links 2304, and depth expansion address and control TX links 2375. All referenced links may be serial communications links, sharing an approximately common signaling rate but not requiring common phase or delay.

Depth expansion address and control TX links 2375 may allow memory device 2300 to be coupled (e.g., cascaded) with other memories (e.g., another instance of memory device 2300) and requests can thereby be cascaded to each coupled memory.

Each of address and control RX links 2302, data TX links 2304, data RX links 2310, error detection RX link 2306, error detection TX link 2308, and depth expansion address and control TX links 2375 may be coupled to serializers/deserializers circuits (SERDES) which, when coupled through encoder and decoder circuits, may receive or send 8-bit data to or from memory device 2300. Note that the links 2302 and/or 2304 may be partitioned such that one or more carries error detection (EDC) data in addition to address data or data.

The deserializer portion of SERDES circuits may deserialize encoded bit streams received via address and control in links 2302, error detection data RX link 2306, and data RX links 2310 and, following decoding, provide 8-bit groups of data, address, and control signals to memory core 2361. Following encoding, the serializer portion of said SERDES circuits may serialize the data for sending out over data TX links 2304, error detection TX link 2308, or depth expansion address and control links 2375, respectively.

During a write operation, memory device 2300 may receive data to be written via data RX links 2310. The corresponding address and control signals for the data may be received via address and control in links 2302, and all of the address, control, and data in links may be protected by an error detection RX link 2306, carrying, for example, a CRC (cyclic redundancy code). In one embodiment, a portion (e.g., half or three links) of address and control in links 2302 may be are used to access memory core 2361 for a write operation while another portion of address and control RX links 2302 may be used for read operations. The partitioning of the information carried by the address and control RX links 2302 into two halves allows read and write operations to be performed substantially simultaneously. In one embodiment, the address and control RX links 2302 of memory device 2300 may include three links for read requests (e.g., read address and control signal) and three links for write requests (e.g., write address and control signal). Where the control signal, within each half of address and control links 2302, may be one bit for read or write operation, each set of three links will thus be able to address $2^{23}$ words of memory (8,388,607 locations).

The use of error detection RX link 2306 and error detection TX link 2308 may allow error detection on read and write operations simultaneously. In one embodiment, an 8-bit CRC value transmitted over error detection RX link 2306 may facilitate error detection of the address and control (and data in a write operation) received on other active links. In another embodiment, data processing within the memory core 2361 may be delayed (e.g., for four character times) to allow receiving of a more powerful error detection code (e.g., a 32-bit CRC). Note that the use of a 32-bit error detection mechanism may require internal tracking of burst-of-4 boundaries, and detection of an error may invalidate all associated received address, control, and data words. The use of error detection information provides for detection, reporting, and handling of a variety of error types including, but not limited to, error flags for link errors (e.g., bad symbols, loss of lock, invalid signaling levels, eye diagram faults), parallel CRC error for receive links, CRC generation for transmit links, and automatic read and write abort on error detection. In an alternate embodiment additional EDC links may be added to allow reception a full 32-bit CRC in a single character time.

During a read operation, memory device 2361 may transmit data out via data TX links 2304 and error detection TX link 2308. Error detection TX link 2308 may provide error detection information corresponding to data sent out over data RX links 2304. In an alternate embodiment, error detection out link 2308 may also provide error detection information corresponding to data sent out over data TX links 2304, and also depth expansion address and control TX links 2375.

Memory device 2300 may synchronize with a coupled host during initialization. Said synchronization may be a multi-step process that occurs on the serial input links of any coupled memory or host, and takes place when power is interrupted, one or more of the links is disconnected, or when link synchronization is lost due to noise or other events. The primary steps of synchronization may include bit synchronization, character synchronization/framing, and word synchronization/alignment.

Bit synchronization may occur when the reference clock on reference clock input 2391 is producing a stable clock, a clock multiplier PLL within each device is locked at the proper operating frequency, and transitions are being received by receivers for each link, and a clock and data recovery circuit (CDR) is sampling bits at the proper clock phase so as to recover encoded bits contained within the serial bit stream at or better than the targeted bit error rate for the serial links.

In one embodiment, bit synchronization may occur as shown in FIGS. 14A and 14B.

Character synchronization may occur following bit synchronization, when the boundaries of the transmission characters have been found by proper detection of one or more of the selected framing character (e.g., K28.5 for one embodiment) and these transmission characters may be made available to associated decoder circuitry.

In one embodiment, character synchronization may occur as shown in FIGS. 15A and 15B.

Word synchronization may occur following character synchronization, when the character streams received on multiple serial links (which are not in phase with each other) are aligned to form the words of multiple data units as originally sent by the host. Note that the serial transmit interface of the host system or memory device may skew these serial streams in time to compensate for variations in encoding and routing delays, and that this word synchronization process may allow a receiving device or system to correctly align these multiple character streams into the original words of parallel bytes of data, address, control, and error detection information.

In one embodiment, word synchronization may occur as shown in FIGS. 17A to 17F.

In one embodiment, there may exist a 1-to-1 correspondence between RX links and TX links, wherein the change in generation of the alternating sequence of K28.5 and K29.7 control symbols on serial out links to a continuous generation of K28.5 control symbols may occur on a per-link basis. This may provide to the host system some level of diagnostic information as to which links are marginal or are unable to correctly achieve character framing.

It is appreciated that while embodiments of the present invention have described character framing based on transmission characters of a particular bit size (e.g., 10-bits), other embodiments may perform character framing based on fewer than a full character bit size (e.g., less than all 10-bits).

In one embodiment, serial memory architecture 2300 may be fabricated as an integrated circuit on a common substrate. The fabrication of serial memory architecture 2300 on a common substrate may simplify PCB routing in fewer layers, reduce PCB area, eliminate external termination resistors, optimize trace length matching, reduce system noise due to lower voltage swing signaling, and reduce electromagnetic interference.

In one embodiment, a memory device may include a memory core with 2 two-bank arrays each of which support concurrent reading and writing, each bank being an 80-bit wide word. A reference clock may be at 156.25 MHz, data RX links 2310 and data TX links 2310 may operate at 6.25 Gb/s. Memory architecture 2300 may thus have a maximum bandwidth of 100 Gb/s (80 bits×0.625 GHz Memory core×2 banks) in such an embodiment. It is noted that while various embodiments have shown address data transmitted from a host device to a serial memory device on uni-directional serial communication links, other embodiments may transmit such data on bi-directional serial communication links.

Still further, while embodiments have shown circuits and methods in which operations are read and write accesses to a serial memory device, other embodiments may include other configurations in which different types of devices transport data over multiple serial communication links, where data units and their corresponding EDCs may be transported all, or in portions, on different serial links as described herein. In addition or alternatively, different types of devices may start-up and align multiple serial communication links that transport data between the devices, and alternate characters or character sequences may be used for such start-up and alignment processes.

It should be appreciated that in the foregoing description of exemplary embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that an invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

It is understood that the embodiments may be practiced in the absence of an element and or step not specifically disclosed. That is, a feature of the embodiments can be elimination of an element.

Accordingly, while the various aspects of the particular embodiments set forth herein have been described in detail, the present invention could be subject to various changes, substitutions, and alterations without departing from the spirit and scope of the invention.

What is claimed is:

1. A serial interface device, comprising:
   a plurality of serial link connections that receive at least address values and at least one error detection code (EDC) on different serial link connections, the EDC generated from at least the address values, the serial link connections for the address values and EDC operated separately from one another; and
   a plurality of output serial links, at least a first one of the output serial links outputting data values read from memory locations corresponding to the address values, and at least a second one of the output serial links different from and operated separately from the first one outputting EDC values generated for the data values read from the memory locations.

2. The serial interface device of claim 1, wherein:
   the plurality of serial link connections includes
   a plurality of address serial link connections coupled to receive a read address value in serial data units in a read mode, and
   at least one error check serial link connection coupled to receive a read address EDC generated for the read address value transmitted on the address serial link connections.

3. The serial interface device of claim 2, further including:
   an error check circuit that makes an error determination on a received read address value with the read address EDC; and
   the at least one error check serial link connection that outputs at least one predetermined error code if an error is determined for the corresponding read address value.

4. The serial interface device of claim 1, further including:
   a memory array configured to output read data in response to at least a read address value received on the at least one serial link connection;
   an error check circuit that generates a read data EDC from the read data; and
   at least one error check serial link connection that outputs the read data EDC, the error check serial link different from and separately operated from a serial link to output the read data.

5. The serial interface device of claim 1, wherein:
   the plurality of serial link connections includes
   a plurality of address link connections coupled to receive a write address value in serial data units in a write operation, and
   at least one data link connection coupled to receive write data in at least one serial data unit in parallel with the write address value in the write operation; and
   at least one error check link connection coupled to receive a write EDC generated based on at least the write address value.

6. The serial interface device of claim 5, further including:
   an error check circuit that makes an error determination on at least the write address value with the write EDC; and
   the at least one error check link connection outputs a predetermined error code if an error is determined for the corresponding write address value or write data.

7. The serial interface device of claim 1, further including:
   the plurality of serial link connections includes a plurality of unidirectional address serial link inputs;
   at least one uni-directional write data serial link input, and
   at least one uni-directional read data serial link output.

8. The serial interface device of claim 1, wherein:
   the plurality of serial link connections includes a plurality of uni-directional address serial link inputs;
   at least one uni-directional error code serial link input that receives at least EDC values generated by a host device, and
   at least one uni-directional error code serial link output that outputs at least EDC values generated by the serial memory device for data values read by the serial memory device, the error code serial data link separately operated from at least one serial link to output the data values.

9. The serial interface device of claim 1, further including:
   a plurality of decoders, one decoder coupled to each of the serial link connections, each decoder receiving serial data units having N bits and selectively converting such N bits into M bit data values, where M<N.

10. The serial interface device of claim 9, wherein:
    each decoder further decodes predetermined serial data units into control codes different from the data values.

11. The serial interface device of claim 1, further including:
    a plurality of serial-to-parallel converters (SIP), each coupled to a corresponding serial link connection, each S/P converting serial data units into parallel data units.

12. The serial interface device of claim 1, further including:
    a code detect circuit coupled to the plurality of serial link connections that generates a host start indication when at least one host start code is detected on at least one of the serial link connections, and
    a transmit code selection circuit that generates at least a first code value for serial transmission on at least one serial link connection from the serial memory device in response to the host start indication.

13. The serial interface device of claim 12, further including:
    a power-on circuit that detects when at least power is applied to the serial memory device, and
    the transmit code selection circuit generates a second code value for serial transmission on the at least serial link connection from the serial memory device prior to receiving the host start indication.

14. A method, comprising:

receiving at least one error detection code (EDC) on at least one of a plurality of serial link connections of a first device;

checking for errors between the at least one EDC and at least one received data unit, at least a portion of the EDC and the received data unit being received on different serial link connections operated independently of one another; and if no errors are found, transmitting first predetermined EDC data from a serial memory device on at least one serial link connection, and if an error is found, transmitting an error indication code from the first device on at least one serial link connection.

15. The method of claim 14, wherein:

receiving at least one EDC includes receiving a read address EDC for a read address data on the at least one address serial link connection;

checking for errors includes generating an internal read EDC from a received read address and comparing the internal read EDC to the at least one received EDC to determine if an error is found; and the first predetermined EDC data includes a read data EDC generated from read data output from a storage location corresponding the read address.

16. The method of claim 14, wherein:

receiving at least one EDC includes receiving a host write EDC for a write address and write data on at least two of the plurality of serial link connections;

checking for errors in at least one address includes generating an internal write EDC from the write address and write data, and comparing the internal write EDC to the host write EDC to determine if an error is detected; and the first predetermined EDC data includes a predetermined acknowledgement code.

17. The method of claim 14, further comprising:

in a startup operation upon detecting predetermined host start up codes received on multiple incoming serial link connections, transmitting second device start up codes as serial data units on separate outgoing serial link connections.

18. A system, comprising:

a serial memory device coupled to a host device by a plurality of serial links, the serial links transmitting at least portions of addresses and at least one error detection code (EDC) for such addresses on different serial links operated independently of one another; and a plurality of input serial links, at least a first one of the input serial links inputting data values read from memory locations corresponding to the addresses, and at least a second one of the input serial links different from and operated separately from the first one inputting EDC values generated for the addresses.

19. The system of claim 18, wherein:

the serial memory device includes a plurality of decoders, each coupled to a serial link and selectively decoding serial data transmitted in serial data units of N bits, into internal data values of M bits, where M<N, or control code values different from the M-bit data values.

20. The system of claim 19, wherein:

the serial memory device includes a code detection circuit that activates a host start up detect indication upon receiving at least one predetermined host start code from the host, and a code selection circuit that initially provides at least first memory start codes for transmission to the host device upon at least a start up condition of the serial memory device, and provides at least second start memory start codes for transmission to the host device upon receiving the at least one predetermined host start code.

* * * * *